US012472227B2

(12) United States Patent
Cheng et al.

(10) Patent No.: US 12,472,227 B2
(45) Date of Patent: Nov. 18, 2025

(54) PHARMACEUTICAL COMPOSITIONS AND USE THEREOF FOR RELIEVING RESISTANCE DUE TO CANCER CHEMOTHERAPY AND ENHANCING EFFECT OF CANCER CHEMOTHERAPY

(71) Applicant: Rise Biopharmaceuticals Inc., Beijing (CN)

(72) Inventors: Jya-Wei Cheng, Tainan (TW); Hsi-Tsung Cheng, Tainan (TW); Hui-Yuan Yu, Tainan (TW); Su-Ya Hsu, Tainan (TW); Wei-Chen Lee, Tainan (TW)

(73) Assignee: RISE BIOPHARMACEUTICALS INC., Beijing (CN)

( * ) Notice: Subject to any disclaimer, the term of this patent is extended or adjusted under 35 U.S.C. 154(b) by 1234 days.

(21) Appl. No.: 17/144,823

(22) Filed: Jan. 8, 2021

(65) Prior Publication Data

US 2021/0128683 A1     May 6, 2021

Related U.S. Application Data

(63) Continuation-in-part of application No. 17/006,512, filed on Aug. 28, 2020, which is a continuation-in-part of application No. 15/569,033, filed as application No. PCT/CN2015/008725 on Jun. 3, 2015, now abandoned.

(60) Provisional application No. 62/959,553, filed on Jan. 10, 2020.

(51) Int. Cl.
    *A61K 38/17*      (2006.01)
    *A61P 35/00*      (2006.01)
    *A61K 45/06*      (2006.01)

(52) U.S. Cl.
CPC .......... *A61K 38/1709* (2013.01); *A61P 35/00* (2018.01); *A61K 45/06* (2013.01)

(58) Field of Classification Search
None
See application file for complete search history.

(56) References Cited

U.S. PATENT DOCUMENTS 5,595,756 A * 1/1997 Bally .................. A61K 9/1272
                                                                         264/4.1

FOREIGN PATENT DOCUMENTS

CN        102596227 A     7/2012

OTHER PUBLICATIONS

Heppner et al. (Cancer Metastasis Review 2:5-23; 1983) (Year: 1983).*
Sporn et al ("Chemoprevention of Cancer," Carcinogenesis, vol. 21 (2000), 525-530 (Year: 2000).*
Auerbach et al (Cancer and Metastasis Reviews, 2000, 19: 167-17) (Year: 2000).*
Gura T (Science, 1997, 278(5340): 1041-1042, encloses 1-5) (Year: 1997).*
Jain RK (Scientific American, Jul. 1994,58-65) (Year: 1994).*
Hait (Nature Reviews/Drug Discovery, 2010, 9, pp. 253-254) (Year: 2010).*
Gravanis et al. (Chin Clin Oncol, 2014, 3(2):22, pp. 1-5) (Year: 2014).*
Beans (PNAS 2018; 115(50): 12539-12543) (Year: 2018).*
Gayvert (PLoS Comput Biol. Jan. 13, 2017;13(1):e1005308) (Year: 2017).*
Yin et al (Front Pharmacol. 2018; 9: 535) (Year: 2018).*
Tallarida et al. Pharmacol. Ther. 2010; 127, 165-174) (Year: 2010).*
Guo et al (Int J Oncol. Dec. 2022; 61(6): 146) (Year: 2022).*
Park et al (European Journal of Cancer (2014) 50, 341-350) (Year: 2014).*
Hagman (Neoplasia. Sep. 2010; 12(9): 740-747) (Year: 2010).*
Bowie et al. (Science, 1990, 247: 1306-1310) (Year: 1990).
Burgess et al. (J. Cell Boil. 111:2129-2138, 1990) (Year: 1990).
Lazar et al. (Mol. Cell. Biol., 8: 1247-1252, 1988) (Year: 1988).
Bork (Genome Research, 2000, 10:398-400) (Year: 2000).
Spron et a., "Chemoprevention of Cancer," Carcinogenesis, vol. 21 (2000), 525-530 (Year 2000).
Gura T (Science, 1997, 278(5340): 1041-1042 (Year: 1997).
Auerbach et al (Cancer and Metastasis Reviews, 2000, 19: 167-172) (Year: 2000).
Le, Y.Y. et al., "Chemokines and Chemokine Receptors: their Maniold Roles in Homeostasis and Disease", Cellular & Molecular Immunology, Apr. 30, 2004, pp. 95-101, vol. 1, No. 2.

* cited by examiner

*Primary Examiner* — Brian Gangle
*Assistant Examiner* — Andrea K McCollum
(74) *Attorney, Agent, or Firm* — MUNCY, GEISSLER, OLDS & LOWE, P.C.

(57) ABSTRACT

The present invention provides a novel chemokine receptor antagonistic modified peptide. The novel chemokine receptor antagonistic modified peptide can be combined with a chemotherapeutic drug for treating cancer, especially for treating drug-resistant cancer, and inhibiting tumor growth more effectively.

3 Claims, 20 Drawing Sheets

Specification includes a Sequence Listing.

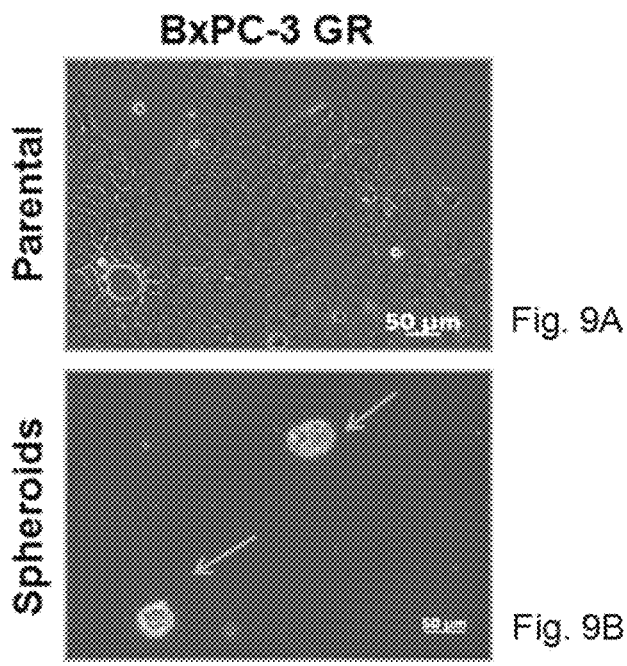
Fig. 9A
Fig. 9B
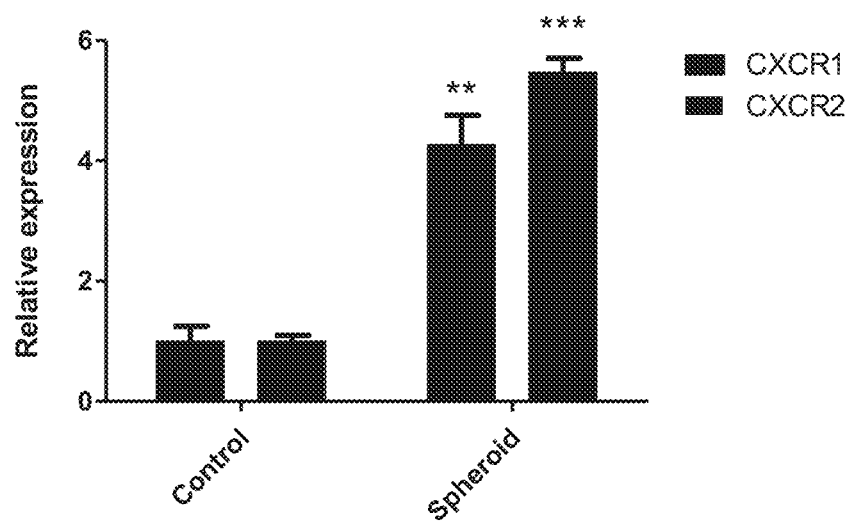
Fig. 9C

PHARMACEUTICAL COMPOSITIONS AND USE THEREOF FOR RELIEVING RESISTANCE DUE TO CANCER CHEMOTHERAPY AND ENHANCING EFFECT OF CANCER CHEMOTHERAPY

CROSS-REFERENCE TO RELATED APPLICATIONS

This application claims priority in U.S. Provisional Patent Application No. 62/959,553, filed Jan. 10, 2020, which is incorporated by reference in its entirety herein.

This application is also a continuation-in-part of U.S. application Ser. No. 17/006,512 filed on Aug. 28, 2020, which is a Continuation-in-Part of U.S. application Ser. No. 15/569,033, filed on Oct. 24, 2017, which claims the benefit of this is a National Phase Application filed under 35 U.S.C. 371 as a national stage of PCT/CN2015/080725, filed Jun. 3, 2015, the content of which is hereby incorporated by reference in its entirety.

FIELD OF THE INVENTION

The present invention relates to a pharmaceutical composition. In particular, the present invention relates to a pharmaceutical composition for relieving anticancer drug resistance and enhancing sensitivity of anticancer drug.

More specifically, the invention furthermore pertains a pharmaceutical composition comprising a chemotherapeutic drug combined with a chemokine receptor antagonistic modified peptide for overcoming anti-cancer agent resistance, treating drug-resistant cancer and patients with drug resistant cancer and inhibiting tumor growth or/and metastasis.

BACKGROUND OF THE INVENTION

Cancer represents a significant burden on human health, accounting for an estimated 13% of all deaths each year. With rapid population growth and aging worldwide, the rising prominence of cancer as a leading cause of death partly reflects in many countries.

Therapy of cancer remains one of the challenges of medicine today. The treatment of late-stage and metastatic cancer remains a major challenge. For example, pancreatic carcinomas are devastating malignancies and the development of effective treatments that have reduced side effects proved to be challenging. Pancreatic cancer is one of the deadliest human malignancies with a 5-year survival rate of less than 14% for stage I and less than 1% for stage IV. Due to the fact that most cases are diagnosed at advanced stages the treatment options for pancreatic cancer are very limited and mostly palliative. Although the molecular and genetic bases of the pancreatic cancer have been extensively studied the treatment options are still limited.

Currently, cancer therapy involves classical chemotoxic chemotherapy, surgery, and/or radiation treatment or eradicate cancerous cells in a patient. All of these approaches pose significant drawbacks for the patient.

Chemotherapy is considered the standard of care for many cancers. Chemotherapy often decreases tumor size, allowing for subsequent surgery followed by radiation and further adjuvant chemotherapy. However, given that most current anticancer agents do not greatly differentiate between cancerous and normal cells, systemic toxicity and adverse effects associated with these chemotherapeutics limit their treatment efficacy. Further, there are a variety of chemotherapeutic agents available for treatment of neoplastic disease.

On the other hand, surgery can be contraindicated due to the health of the patient or can be unacceptable to the patient. Additionally, surgery might not completely remove the neoplastic tissue. Radiation therapy is effective only when the irradiated cancerous tissue exhibits a higher sensitivity to radiation than normal tissue, and radiation therapy can also often elicit serious side effects.

Numerous neoplasia-treating agents are currently in use today, including any chemotherapeutic agents, and biotherapeutic agents as well as radiation therapy.

Gemcitabine is an approved chemotherapeutic agent for a wide range of tumors that include, but are not limited to, pancreatic and colorectal carcinoma. The efficacy of gemcitabine is marginal, however, and life expectancy is rarely extended, particularly for pancreatic cancer patients. Side effects of gemcitabine administration are relatively mild when compared to other chemotherapeutic agents, consisting of myelosuppression with increased risk of infection, decreased platelet count with increased risk of bleeding, nausea, vomiting, increased liver function blood tests and fatigue. Gemcitabine, in general, however, has replaced other therapies because of its less toxic effects on the patient, and hence, a better quality of life.

On the other hand, in recent years, a new model of tumorigenesis has gained wide acceptance, where it is hypothesized that only a small fraction of the entire tumor mass are responsible for the tumorigenic activities within the tumor. This small fraction of tumorigenic cells, according to the new model, are transformed cells with stem-cell-like qualities and are called "cancer stem cells" (CSCs).

Since the surviving cancer stem cells can repopulate the tumor and cause relapse, it is imperative that anti-cancer therapies include strategies against CSCs. By selectively targeting cancer stem cells, it becomes possible to treat patients with aggressive, non-resectable tumors, and refractory or recurrent cancers, as well as preventing tumor metastasis and recurrence. Development of specific therapies targeting cancer stem cells therefore holds hope for survival and improved quality of life of cancer patients, especially for those with metastatic cancers.

However, the most significant problem oncologists face in the treatment of cancer, is the existence of drug resistance in tumors resulting in decreased cytotoxicity of chemotherapy agents. Some cancers are drug resistant prior to treatment, whereas others develop drug resistance during treatment.

Moreover, Solid tumour growth is generally angiogenesis (neovascularization)-dependent. Endothelial cells (EC) in the vasculature play an essential role in angiogenesis, and there is accordingly a need for therapeutic agents that target this activity. The proliferation, migration and differentiation of vascular endothelial cells during angiogenesis is understood to be modulated in both normal and disease states by the complex interactions of a variety of chemokines and chemokine receptors. At present, it is proved that many different types of tumors are able to secret ELR-CXC chemokines, especially referring to CXCL8, with CXCR1 and CXCR2 on the endothelial cells (ECs).

In view of these problems, there is a need in the art for new, safe therapies directed to preventing, treating, and inhibiting cancer, including inhibiting cancer cell metastasis, cancer cell proliferation, tumor growth, and/or angiogenesis.

SUMMARY OF THE INVENTION

An object of the invention is to provide an agent/a medicament/a pharmaceutical composition for overcoming drug resistance, or an agent/a medicament/a pharmaceutical composition for overcoming anti-cancer agent resistance.

Another aspect of the present invention provides methods of treating cancer, methods of treating drug-resistant cancer, and pharmaceutical compositions for use in treating cancer in subjects such as those with drug-resistant cancer.

Another aspect of the present invention provides a method for treating a cancer in an individual comprising administering to the individual a combination therapy which comprises one or more chemokine receptor antagonistic modified peptide and one or more medicaments.

Other embodiments provide use of a chemokine receptor antagonistic modified peptide in the manufacture of medicament for treating a cancer in an individual when administered in combination with a chemotherapeutic drug, a pharmaceutically acceptable buffer, diluent, carrier, adjuvant or excipient; and use of a chemotherapeutic drug, a pharmaceutically acceptable buffer, diluent, carrier, adjuvant or excipient in the manufacture of a medicament for treating a cancer in an individual when administered in combination with a chemokine receptor antagonistic modified peptide.

In summary, these and other objects have been achieved according to the present disclosure which demonstrates enhanced efficacy and survival rates with reduced concomitant side effects and toxicity commonly encountered with chemotherapeutic agents.

Detailed description of the invention is given in the following embodiments with reference to the accompanying drawings.

BRIEF DESCRIPTION OF THE DRAWINGS

FIG. 3A demonstrated the establishment of BxPC-3GR. FIG. 3B demonstrated the establishment of MIAPaCa2.

FIG. 4A demonstrated mRNA expression of BxPC-3GR compared with BxPC-3. FIG. 4B demonstrated mRNA expression of MIAPaCa2GR compared with MIAPaCa2. Data are shown as mean±SD. *P<0.05; P<0.01; *P<0.001, student's t-test.

FIG. 5A demonstrated mRNA expression of BxPC-3GR compared with BxPC-3. FIG. 5B demonstrated mRNA expression of MIAPaCa2GR compared with MIAPaCa2. Data are shown as mean±SD. *P<0.05; P<0.01; *P<0.001, student's t-test.

FIG. 6A demonstrated the invasion rate of BxPC-3GR treated by Gemcitabine with ONCO P-8, or treated by Gemcitabine with ONCO P-8 and IL-8, or treated by Gemcitabine with IL-8 respectively. FIG. 6B demonstrated the invasion rate of MIAPaCa2GR treated by Gemcitabine with ONCO P-8, or treated by Gemcitabine with ONCO P-8 and IL-8, or treated by Gemcitabine with IL-8 respectively.

FIG. 9A-9C show that comparisons of cell morphology and CXCR1/CXCR2 gene expression were between BxPC-3GR parentel cells and spheroid derived from BxPC-3GR. FIG. 9A shows cell morphology of BxPC-3GR parental cells. FIG. 9B shows cell morphology of spheroid derived from BxPC-3GR. FIG. 9C shows RNA expressions of CXCR1 and CXCR2 on spheroids derived from BxPC-3GR were higher than parental BxPC-3GR cells.

FIG. 13A demonstrated the tumor size ($mm^3$) of xenograft model. FIG. 13B demonstrated the weight (g) of xenograft model. FIG. 13C demonstrated the survival rate (%) of xenograft model. The survival rate of xenograft model treated by ONCO P-8 or treated by Gemcitabine with ONCO P-8 is about 100%.

FIG. 14A was a schematic diagram displaying the experimental procedure of the Gemcitabine-resistant PDAC xenograft tumor model. FIG. 14B demonstrated the tumor size ($mm^3$) of Gemcitabine-resistant xenograft tumor model. FIG. 14C demonstrated the appearance of tumors were taken after sacrificed at Day 72 (scale bar=10 mm) FIG. 14D demonstrated the survival rate of the "ONCO P-8+Gemcitabine group" compared to the "Gemcitabine group" until Day 72. Data are shown as mean±SEM (n=8). *P<0.05; P<0.01; *P<0.001, student's t-test.

FIG. 15A show IL-8 mRNA expression was compared between the "Gemcitabine+ONCO P-8 group" and the "Gemcitabine group". FIG. 15B show CXCR1 mRNA expression was compared between the "Gemcitabine+ ONCO P-8 group" and the "Gemcitabine group". FIG. 15C show CXCR2 mRNA expression was compared between the "Gemcitabine+ONCO P-8 group" and the "Gemcitabine group".

FIG. 16A showed the binding capacity of ONCO P8-CXCR2 complex formation. FIG. 16B showed the binding capacity of IL-8-CXCR2 complex formation.

FIG. 17A showed the binding capacity of ONCO P8-CXCR1 complex formation. FIG. 17B showed the binding capacity of IL-8-CXCR1 complex formation.

DETAILED DESCRIPTION OF THE INVENTION

Figure 1:
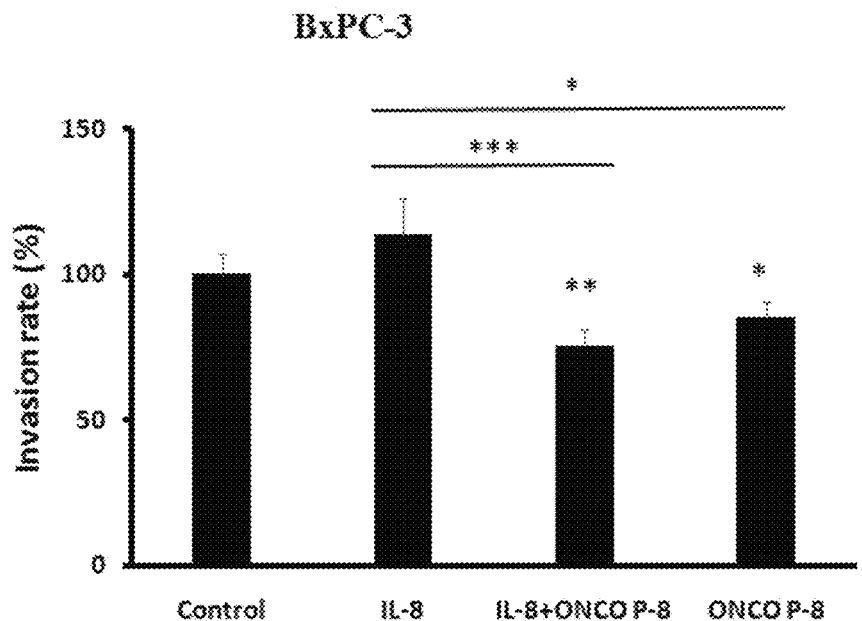
FIG. 1 depict ONCO P-8 can neutralize the effect of CXCL8 to reduce the invasive rate of Human pancreatic cancer (PDAC) cells. Data are shown as mean±SD. *P<0.05; ***P<0.001, student's t-test.

The following definitions are meant to clarify, but not limit, the terms defined. If a particular term used herein is not specifically defined, such term should not be considered indefinite. Rather, terms are used within their accepted meanings by those of skill in the art.

As used herein, the term "agent" refers to a compound having a pharmacological activity or effect on a patient. The terms "agent," "active ingredient," "compound," and "drug" are used interchangeably herein.

The term "cytokine" refers to functional small peptides which under physiological conditions control the cell-to-cell communication within the various body tissues. Cytokines are also called interleukins, monokines, lymphokines, chemokines and growth factors. It has been observed that the local tissue or circulating cytokine levels is altered in a number of cancers, which may affect the development/advancement, treatment and prognosis. Elevated cytokine levels, for example, have been associated with reducing the anti-cancer activity of various treatments. Cytokines have also been demonstrated to exacerbate the toxic effects of chemotherapy and affect drug metabolism Inflammatory cytokines such as interferons and interleukins produced in the tumor microenvironment play a role in stimulation or inhibition of disease progression.

The term "pharmaceutical combination" or "combination" as used herein means the combined administration of the therapeutic agents, which can be a chemokine receptor antagonistic modified peptide or/combined with a chemotherapeutic drug. In the context of the present invention, the therapeutic agents include a chemokine receptor antagonistic modified peptide or/combined with a chemotherapeutic drug that can be administered independently at the same time or separately within time intervals such that these time intervals allow the combination partners to exhibit a synergistic effect.

The term "synergistic" or "synergistic effect" as used herein refers to the therapeutic effect achieved with the combination of the present invention and/or through the method of treating cancer of this invention; which is greater than the sum of the effects that result from using the chemokine receptor antagonistic modified peptide and the chemotherapeutic drug alone or separately. Advantageously, such synergy between the therapeutic agents allows for the use of smaller doses of one or both therapeutic agents, provides greater efficacy at the same doses, and/or prevents or delays building up of drug resistance. The synergistic effect can be achieved either by co-formulating the therapeutic agents contained in the pharmaceutical combination or the composition as described herein or administering the said therapeutic agents simultaneously through a unit dosage form or as separate formulations administered simultaneously or sequentially.

The term "therapeutically effective amount" as used herein means an amount of a chemokine receptor antagonistic modified peptide or/combined with a chemotherapeutic drug effective in producing the desired therapeutic response in a particular patient (subject) suffering from cancer. Particularly, the term "therapeutically effective amount" includes the amount of the therapeutic agents, which when administered will achieve the desired therapeutic effects. In the context of the present invention the desired therapeutic effects includes partial or total inhibition, delay or prevention of the progression of cancer including cancer metastasis; inhibition, delay or prevention of the recurrence of cancer including cancer metastasis; and/or the prevention of the onset or development of cancer in a subject. In respect of the therapeutic amount of the therapeutic agents i.e. the chemokine receptor antagonistic modified peptide or/combined with the chemotherapeutic drug, consideration is also given that the amount of each of the therapeutic agent used for the treatment of a subject is low enough to avoid undesired or severe side effects, within the scope of sound medical judgment. The therapeutically effective amount when used in combination will vary with the age and physical condition of the end user, the severity of cancer, the duration of the treatment, the nature of any other concurrent therapy, the specific type of therapeutic agent employed for the treatment, the particular pharmaceutically acceptable carrier utilized in the pharmaceutical compositions containing the therapeutic agents and other relevant factors.

The term "subject" as used herein refers to an animal, particularly a mammal, and more particularly, a human. The term "mammal" used herein refers to warm-blooded vertebrate animals of the class "Mammalia", including humans. The term mammal includes animals such as cat, dog, rabbit, cattle, horse, sheep, goat, monkey, mouse, rat, gerbil, guinea pig, pig and the human. The term "subject" may be used interchangeably with the term patient. In the context of the present invention the phrase "a subject in need thereof" means a subject in need of the treatment for cancer. Alternatively, the phrase "a subject in need thereof" means a subject (patient) diagnosed with cancer.

The term "administration" or "administering" includes routes of introducing the compounds of the invention to a subject to perform their intended function. Examples of routes of administration that may be used include injection (subcutaneous, intravenous, parenterally, intraperitoneally, intrathecal), oral, inhalation, rectal and transdermal. The pharmaceutical preparations may be given by forms suitable for each administration route.

"Treating" or "treatment" as used herein refers to the treating or treatment of a disease or medical condition (such as cancer, tumor, neoplasm conditions) in a subject/patient, such as a mammal (particularly a human or a companion animal) which includes ameliorating the disease or medical condition, i.e., eliminating or causing regression of the disease or medical condition in a subject/patient; suppressing the disease or medical condition, i.e., slowing or arresting the development of the disease or medical condition in a subject/patient; or alleviating the symptoms of the disease or medical condition in a subject/patient.

The term "pharmaceutically acceptable" as used herein means the carrier, diluent, excipient, and/or salt used in the composition should be compatible with the other ingredients of the formulation, and not deleterious to the recipient thereof "Pharmaceutically acceptable" also means that the compositions or dosage forms are within the scope of sound medical judgment, suitable for use for a subject such as an animal or human without excessive toxicity, irritation, allergic response, or other problems or complication, commensurate with a reasonable benefit/risk ratio.

As used herein the term "neoplasm" refers to an abnormal growth of cells or tissue and is understood to include benign, i.e., non-cancerous growths, and malignant, i.e., cancerous growths. The term "neoplastic" means of or related to a neoplasm. The term "anti-neoplastic agent" is understood to mean a substance producing an anti-neoplastic effect in a tissue, system, animal, mammal, human, or other subject.

Diseases that can be treated using the compounds of the present invention include, but are not limited to cancers, such as cancerous tumors. "Cancer" is meant to refer to any disease that is caused by or results in inappropriately high levels of cell division, inappropriately low levels of apoptosis, or both.

As used herein, the term "pancreatic cancer" refers to any cancer having its origin in pancreas cells, and includes metastatic and local forms of pancreatic cancer. In certain embodiments, a particular subpopulation of patients with pancreatic cancer can be treated according to combination therapies of this invention. The combination of agents of the invention may be utilized to enhance the efficacy and a reduction in the required amount of either agent to achieve the efficacy.

The term "cancer stem cell" or CSC refers to a cell that has tumor-initiating and tumor-sustaining capacity, including the ability to extensively proliferate, form new tumors and maintain cancer development, i.e., cells with indefinite proliferative potential that drive the formation and growth of tumors. CSCs are biologically distinct from the bulk tumor cells and possess characteristics associated with stem cells, specifically the ability to self renew and to propagate and give rise to all cell types found in a particular cancer sample. The term "cancer stem cell" or CSC includes both gene alteration in stem cells (SCs) and gene alteration in a cell which becomes a CSC.

CSCs are also called tumor initiating cells, cancer stem-like cells, stem-like cancer cells, highly tumorigenic cells, tumor stem cells, solid tumor stem cells, or super malignant cells. On the other hand, CSCs have been demonstrated to be fundamentally responsible for tumorigenesis, cancer metastasis, and cancer reoccurrence.

The term "differentiation" of cancer stem cells as used herein refers to both the change of cancer stem cells into pluripotent tumor progenitors and the change of pluripotent tumor progenitors into unipotent tumor progenitors and/or terminally differentiated tumor cells.

The term "expression" refers the biosynthesis of a gene product. For example, in the case of a coding sequence, expression involves transcription of the coding sequence into mRNA and translation of mRNA into one or more polypeptides. Conversely, expression of a non-coding sequence involves transcription of the non-coding sequence into a transcript only.

As used herein, the term "anti-proliferative effects" means the ability of an agent or agents of the present invention to inhibit cancer cell growth and cell division or to reduce the incidence of cancer cell growth and cell division in an individual. In an embodiment, an agent of the present invention results in an anti-proliferative effect by affecting cytokine production. In an embodiment, an agent or agents of the present invention reduces the incidence of cancer cell growth and cell division in an individual by about 1% to about 99.0% as compared to an existing drug known to have anti-proliferative effects.

As used herein, the term "anti-invasion effects" means the ability of an agent or agents of the present invention to prevent cancer invasion or to reduce the incidence of tumor invasion in an individual. In an embodiment, an agent or agents of the present invention reduces the incidence of tumor invasion in an individual by about 1% to about 99.0% as compared to an existing drug known to have anti-invasion effects.

As used herein, the term "anti-migration effects" means the ability of an agent or agents of the present invention to prevent cancer cell migration or to reduce the incidence of tumor cell migration in an individual once tumor cells acquire the ability to penetrate the surrounding tissues, the process of invasion is instigated as these moving cells pass through the basement membrane and extracellular matrix, progressing to intravasation as they penetrate the lymphatic or vascular circulation. The metastatic cells then journey through the circulatory system invading the vascular basement membrane and extracellular matrix in the process of extravasation. Ultimately, these cells will attach at a new location and proliferate to produce the secondary tumor. In an embodiment, an agent or agents of the present invention reduces the incidence of tumor cell migration in an individual by about 1% to about 99.0% as compared to an existing drug known to have anti-migration effects.

As used herein, the term "anti-metastatic effects" means the ability of an agent or agents of the present invention to prevent, or reduce the incidence of, at least one of the following steps in the metastatic process: (1) detachment of cancer cells from the primary site, (2) induction and invasion into new blood vessels, (3) exiting from the blood circulation, and (4) establishment of a new colony at distant sites. In an embodiment, an agent or agents of the present invention reduces the incidence of one of the steps in the metastatic process in an individual by about 1% to about 99.0% as compared to an existing drug known to have anti-metastatic effects.

"Clinical benefit" refers to a phrase used by doctors and/or clinicians treating cancer. The term encompasses any appreciated or perceived benefit encountered by a subject/patient during therapy. As used herein, the term includes but is not limited to one or more of clinical benefit is one or more of decrease in tumor size, suppression or decrease of tumor growth, delayed time to progression, no new tumor or lesion, a decrease in new tumor formation, an increase in survival or progression-free survival, and no metastases.

According to one aspect, the present invention provides a pharmaceutical composition for relieving anticancer drug resistance and enhancing sensitivity of anticancer drug, which comprises a chemokine receptor antagonistic modified peptide at least. In addition, the pharmaceutical composition further comprises a chemotherapeutic drug.

The terms "amino acid sequence," "protein," "polypeptide" and "peptide" are used interchangeably herein to refer to two or more amino acids, or "residues," covalently linked by an amide bond or equivalent. Amino acid sequences can be linked by non-natural and non-amide chemical bonds.

Optionally, in an exemplary embodiment of the present invention, the chemokine receptor antagonistic modified peptide of the present invention includes, but are not limited to, ONCO P-8 (SEQ ID NO: 1).

Sequences of ONCO P-8 (SEQ ID NO: 1) which can be employed in accordance with the invention are shown hereinbelow:
SEQ ID NO: 1:
GSKELRCQCIRSYSKPFHPK-
FIKELRVIPASQFCANTEIIVKLSDGREL-
CLDPKENWVQRVVEKFLKRAENS Furthermore, ONCO P-8 was designed as an analogous protein of CXCL8 (IL-8) and became the antagonist of CXCR1 and CXCR2.

In one embodiment, ONCO P-8 directly binds to IL-8 (CXCL8), thereby inhibiting the binding of IL-8 to its receptors CXCR1 and CXCR2 in the present invention.

In another embodiment, the pharmaceutical composition further comprises a medicament, wherein the medicament comprises a chemotherapeutic drug, a pharmaceutically acceptable buffer, diluent, carrier, adjuvant or excipient.

Chemotherapeutic drugs of several different types including, for example, antimetabolites, antibiotics, alkylating agents, plant alkaloids, hormonal agents (e.g., corticosteroid hormones, sex hormones), immunomodulators, anticoagulants, antithrombotics, nitrosoureas, mitotic inhibitors, L-asparaginase, tretinoin and other natural products. Specific, non-limiting examples of these classes of drugs, as well as cancers that can be treated by their use, are as follows.

Antimetabolite agents are believed to interfere with normal metabolic pathways, including those necessary for making new DNA. Common antimetabolites include, without limitation, folate antagonists (e.g., methotrexate, Pemetrexed (Alimta®)), purine antagonists (e.g., 6-mercaptopurine, 6-thioguanine, fludarabine, dacarbazine, cladribine, and pentostatin), and pyrimidine antagonists (e.g., gemcitabine (Gemzar®), capecitabine, 5-fluorouracil (5-FU), cytarabine (cytosine arabinoside or Ara C), and azacitidine (Vidaza®)).

Gemcitabine is a pyrimidine analogue that belongs to a general group of chemotherapeutic drugs known as antimetabolites and that also acts as a radiation-sensitizing agent. Gemcitabine exhibits cell phase specificity, primarily killing cells undergoing DNA synthesis, i.e., the S-phase, and also blocks the progression of cells through the G1/S-phase boundary Further, the antimetabolite drugs can be used with include, but not limited to, e.g., tegafur, raltitrexed, hydroxyurea and floxuridine and the like. Gallium nitrate is another anti-metabolite that inhibits ribonucleotides reductase. Anti-metabolites such as those mentioned above can be used in combination with one or more other antimetabolites and/or with one or more chemotherapy agents of a different class(es).

As is noted above, another class of chemotherapeutic drugs can be used includes anticancer antibiotics. These include, for example, anthracyclines (e.g., doxorubicin (adriamycin), epirubicin, daunorubicin, and idarubicin), dactinomycin, idarubincin, plicamycin, mitomycin, and bleomycin.

More particularly, the antitumor antibiotics are selected from the group consisting of, but not limited to actinomycin D, mitoxantrone, aclarubicin and neocarzinostatin.

Alkylating agents are chemotherapy agents that attack the negatively charged sites on the DNA (e.g., the oxygen, nitrogen, phosphorous and sulfur atoms) and bind to the DNA thus altering replication, transcription and even base pairing. It is also believed that alkylation of the DNA also leads to DNA strand breaks and DNA strand cross-linking By altering DNA in this manner, cellular activity is effectively stopped and the cancer cell will die. Common alkylating agents include, without limitation, procarbazine, ifosphamide (IFO), cyclophosphamide, melphalan, chlorambucil, decarbazine, busulfan, thiotepa, altretamine, cisplatin, carboplatin, nitrosourea, carmustine, alkyl sulfonates, ethyleneimines, altretamine (Hexamethylmelamine), nitrogen mustards (mechlorethamine), Temozolomide, imidazotetrazines, streptozocin, triazenes, temozolomide, mechlorethamine, mustine, uramustine, uracil mustard, ifosfamide, oxaliplatin, lomustine (CCNU), and the like. Alkylating agents such as those mentioned above can be used in combination with one or more other alkylating agents and/or with one or more chemotherapy agents of a different class(es)

An additional type of chemotherapeutic drug can be administered, according to the invention, is plant alkaloids, such as vinblastine, vincristine, etoposide, teniposide, topotecan, irinotecan, paclitaxel, and docetaxel.

Still further, in some embodiments of the plant alkaloid is selected from the group consisting of, but not limited to berberine, oxyberberine, berbamine, palmatine, magnoflorine, phellodendrine, jateorrhizine, candicine, menisperine, coptisine, worenine, columbamine, epiberberine, hydrastine, canadine, hydrastidine, oxycyanthine, berberrubine and isotetrandine.

Further types of anti-cancer agents that can be used, according to the invention, are anticoagulants and antithrombotic agents. For example, heparin (e.g., low molecular weight heparin or heparin sulfate) or warfarin can be used.

In further embodiments, the mitotic inhibitor is selected from the group consisting of, but not limited to paclitaxel, docetaxel, vinblastine, vincristine, and etoposide.

Hormone therapies block cellular receptors, inhibit the in vivo production of hormones, and/or eliminate or modify hormone receptors on cells, all with the end result of slowing or stopping tumor proliferation. Common hormone therapies include, without limitation, antiestrogens (e.g., tamoxifen, toremifene, fulvestrant, raloxifene, droloxifene, idoxifene and the like), progestogens) e.g., megestrol acetate and the like) aromatase inhibitors (e.g., anastrozole, letrozole, exemestane, vorozole, exemestane, fadrozole, aminoglutethimide, exemestane, 1-methyl-1,4-androstadiene-3,17-dione and the like), anti-androgens (e.g., bicalutimide, nilutamide, flutamide, cyproterone acetate, and the like), luteinizing hormone releasing hormone agonist (LHRH Agonist) (e.g., goserelin, leuprolide, buserelin and the like); 5-.alpha.-reductase inhibitors such as finasteride, and the like.

The "immunomodulator" can be any suitable immunomodulator, such as a cytokine or an adjuvant, for example, obtained from any suitable source, such as a mammal, e.g., a human. Desirably, the immunomodulator induces or stimulates an immune response to the viral antigen expressed by the cell line. Cell-targeting means also can be considered immunomodulators. Likewise, antibodies (or antigenically reactive fragments thereof), antisense molecules, dsRNAi, and the like also can be considered immunomodulators to the extent that they inhibit or block the ability of a viral gene product to block the action of an interferon, if so desired.

Examples of suitable immunomodulatory cytokines include interferons (e.g., IFNα, IFNβ and IFNγ), interleukins, tumor necrosis factors (e.g., TNFα and TNFβ), erythropoietin (EPO), FLT-3 ligand, gIp10, TCA-3, macrophage colony stimulating factor (M-CSF), granulocyte colony stimulating factor (G-CSF), and granulocyte-macrophage colony stimulating factor (GM-CSF), as well as functional fragments of any of the foregoing. The most preferred immunomodulatory cytokine is GM-CSF, such as human GM-CSF, including a functional fragment thereof. Examples of adjuvants include, but are not limited to, heat shock protein, CpG, *Listeria monocytogenes*, aluminum hydroxide (for use with soluble antigen), aluminum phosphate (alum; for use with soluble antigen), muramyl dipeptide, muramyl tripeptide, *Mycobacterium tuberculosis*, QuilA (a purified saponin from the plant *Quillaja saponaria*), alone or in further combination with glycosides, cholesterol, and/or phospholids, empty adenoviral capsids; etc.

There is no special restriction on the weight ratio, volume ratio and concentration ratio between chemokine receptor antagonistic modified peptide and chemotherapeutic drug. One skilled in the art can select appropriate ratios between chemokine receptor antagonistic modified peptide and chemotherapeutic drug according to the disease, particularly a chemokine receptor antagonistic modified peptide when combined with a chemotherapeutic drug exhibits synergistic effect. In an embodiment, the chemokine receptor antagonistic modified peptide administrations are from about 0.01 mg/kg to about 500 mg/kg subject (patient) weight once to three times per week.

In addition, the present invention provides the use of a pharmaceutical composition for relieving anticancer drug resistance and enhancing sensitivity of anticancer drug, and the pharmaceutical composition for treating cancer, inhibiting cancer cell growth and/or inhibiting cancer cell metastasis.

The pharmaceutical composition of the present invention can inhibit the angiogenesis-related diseases or the angiogenesis-dependent diseases of a subject. The angiogenesis-related diseases or the angiogenesis-dependent diseases include, but not limited to, vascular invasion and abnormal cell proliferation, e.g. tumor or cancer. The cancers in the present invention include, but not limited to, chest cancer, abdominal cancer, gastrointestinal cancers, head and neck cancer, brain cancer, endocrine cancer, urologic cancer, male reproductive system neoplasm, gynecologic cancer, blood cancer, skin cancer, and sarcoma.

The chest cancers are selected from lung cancer, including small cell lung cancer (SCLC) and/or non-small cell lung cancer (NSCLC). The NSCLC can be selected from pulmonary adenocarcinoma, squamous cell carcinoma and/or large cell carcinoma. The SCLC can be selected from small cell carcinoma and mixed small cell/large cell cancer or combined small cell lung cancer.

The abdominal cancers include, but not limited to, liver cancer, colorectal cancer, pancreatic cancer, kidney cancer (renal cell cancer), stomach cancer (gastric cancer), adrenocortical cancer, primary peritoneal cancer, peritoneal mesothelioma.

The gastrointestinal cancers include, but not limited to, esophageal cancer, stomach cancer (gastric cancer), liver cancer (hepatocellular carcinoma), gallbladder & biliary tract cancer, pancreatic cancer, colorectal cancer, small bowel cancer, and anal cancer.

The head and neck cancers include, but not limited to, laryngeal and hypopharyngeal cancer, nasal cavity and paranasal sinus cancer, nasopharyngeal cancer, oral and oropharyngeal cancer, and salivary gland cancer.

The types of brain tumors include primary brain tumors or secondary brain tumors. The brain tumors include, but not limited to, astrocytoma, glioblastoma, medulloblastoma, oligodendroglioma, glioma, and brain metastases.

The endocrine cancers include, but not limited to, adrenal tumors, neuroendocrine tumors, parathyroid tumors, pituitary tumors, and thyroid disorders.

The urologic cancers include, but not limited to, bladder cancer and urethral cancer.

The male reproductive system neoplasm include, but not limited to, prostate carcinoma, penile carcinoma, testicular seminoma, and testicular embryonal carcinoma.

The gynecologic cancers include, but not limited to, cervical cancer, ovarian cancer, uterine cancer (endometrial cancer), vaginal cancer, and vulvar cancer.

The blood cancers include, but not limited to, leukemia, Hodgkin lymphoma, non-Hodgkin lymphoma and multiple myeloma.

The skin cancers include, but not limited to, basal cell skin cancer, squamous cell skin cancer, melanoma skin cancer and Merkel cell skin cancer.

The sarcoma includes, but not limited to, soft tissue sarcoma, osteosarcoma (bone sarcoma), and rhabdomyosarcoma.

The neoplasm or/and cancer further include, but not limited, breast cancer, and neuroblastoma.

In an embodiment, the chemokine receptor antagonistic modified peptide or/combined with the chemotherapeutic drug can be administered by conventional routes of administration including, but not limited to oral, intravascular, intradermal, transdermal, intramuscular, intraperitoneal, intratumoral, parenteral, nasal, rectal, sublingual, topical, aerosol, or intratrach.

In an embodiment, the chemokine receptor antagonistic modified peptide and/or one or more of the chemotherapeutic drug(s) can be administered in a form suitable for oral administration such as tablets, lozenges, aqueous or oily suspensions, granules, powders, cachets, emulsions, capsules, syrups, elixirs and the like.

In another embodiment, the chemokine receptor antagonistic modified peptide and/or one or more of the chemotherapeutic drug(s) can be administered parenterally such as, by intramuscular, intrathecal, subcutaneous, intraperitoneal, intravenous bolus injection or intravenous infusion. Parenteral administration can be accomplished by incorporating the chemokine receptor antagonistic modified peptide and/or the chemotherapeutic drug(s) into a solution or suspension.

In one embodiment, the chemokine receptor antagonistic modified peptide and/or one or more of the chemotherapeutic drug(s) can be administered in the form of a pharmaceutical composition containing the said chemokine receptor antagonistic modified peptide and/or one or more of the chemotherapeutic drug(s) and at least one pharmaceutically acceptable diluent, excipient or carrier.

The pharmaceutical composition comprises a chemokine receptor antagonistic modified peptide and/or at least one chemotherapeutic drug and one or more pharmaceutically acceptable diluent, excipient or carrier. For the production of pills, tablets, coated tablets and hard gelatin capsules, the pharmaceutically active excipients that can be used include, but not limited to, lactose, corn starch or derivatives thereof, gum arabica, magnesia or glucose, etc. For soft gelatin capsules and suppositories, the carriers that can be used include, but not limited to, fats, waxes, natural or hardened oils, etc. Suitable carriers for the production of solutions, are, for example injection solutions, or for emulsions or syrups are, for example, water, physiological sodium chloride solution, Phosphate Buffered Saline (PBS), or alcohols, for example, ethanol, propanol or glycerol, sugar solutions, such as glucose solutions or mannitol solutions, or a mixture of the various solvents which have been mentioned. The pharmaceutically acceptable diluents, excipients or carriers used in the pharmaceutical composition can conventionally known pharmaceutically acceptable diluents, excipients or carriers, which can be selected depending on the dosage form and the route of administration of the chemokine receptor antagonistic modified peptide and/or the chemotherapeutic drug(s).

In general, compositions intended for pharmaceutical use can be prepared according to any method known in the art for the manufacture of pharmaceutical compositions.

The compositions described herein can be in a form suitable for oral administration, for example, solid dosage forms such as tablets, capsules, lozenges, or granules; liquid dosage forms such as, emulsions, solutions, suspensions; for parenteral injection (including intravenous, subcutaneous, intramuscular, intravascular or infusion) for example as a sterile solution, suspension or emulsion; for topical administration for example as an ointment, cream, gel or lotion.

Compositions for oral administrations can be in the form of tablets, lozenges, aqueous or oily suspensions, granules, powders, cachets, emulsions, capsules, syrups, or elixirs. Compositions suitable for oral administration can include standard vehicles. Such vehicles are preferably of pharmaceutical grade.

For ointments and creams, the active ingredient (chemokine receptor antagonistic modified peptide and/or chemotherapeutic drug(s)) can be formulated in oil-in-water or water-in-oil base.

For intramuscular, intraperitoneal, subcutaneous and intravenous use, sterile solutions of the active ingredient (chemokine receptor antagonistic modified peptide and/or chemotherapeutic drug(s)) are usually employed, and the pH of the solutions should be suitably adjusted and buffered.

Further, the anticancer effect of chemokine receptor antagonistic modified peptide and/or chemotherapeutic drug(s) contained in the pharmaceutical composition can be delayed or prolonged through a proper formulation.

Although the effective doses of the chemokine receptor antagonistic modified peptide and/or chemotherapeutic drug(s) used for administration vary depending on the severity of the disease (cancer), the severity of symptoms, the age, sex, body weight and sensitivity difference of the subject (the patient), the mode, time, interval and duration of administration, the nature and type of formulation, etc. In certain embodiments, the chemokine receptor antagonistic modified peptide and/or one or more chemotherapeutic drug(s) can be administered in a time frame where both the agents are still active. One skilled in the art would be able to determine such a time frame by determining the half life of the administered therapeutic agents. As indicated herein before, in the pharmaceutical combination and/or the method of treatment of cancer and/or the use for the treatment of cancer according to the present invention the chemokine receptor antagonistic modified peptide and one or more chemotherapeutic drug(s) can be administered simultaneously or sequentially and when administered sequentially in any order. In another embodiments, the chemokine receptor antagonistic modified peptide and chemotherapeutic drug(s) can be administered in the manner that the peak pharmacokinetic effect of one agent coincides with the peak pharmacokinetic effect of the other.

However, the chemokine receptor antagonistic modified peptide or/and chemotherapeutic drug(s) of the invention may alternatively be for use in combination with one or more additional cancer treatments. For example, the chemokine receptor antagonistic modified peptide or/and chemotherapeutic drug(s) may be used in combination with one, two, three, four, five or more additional cancer treatments.

By "in combination" the present invention include that the pharmaceutical composition is administered to a subject who is receiving one or more additional cancer treatments in the same course of therapy. Thus, the term covers not only the concomitant administration of the pharmaceutical composition with one or more additional cancer treatments (e.g., either as bolus doses or infusions) but also the temporally separate administration of these cancer treatments. For example, the pharmaceutical composition may be administered within a treatment schedule/cycle as defined by the patient's oncologist to include one or more additional cancer treatments, administered either before, concomitantly with or after the pharmaceutical composition depending on any of a variety of factors, e.g., severity of the symptoms, etc.

In another embodiment, a therapeutically effective amount of a chemokine receptor antagonistic modified peptide or/and chemotherapeutic drug(s) for treatment of a specific cancer depends on the type and nature of the cancer, its size, progress, and metastatic state, and should be determined at consultation with a physician in charge.

For example, in some embodiments, the pharmaceutical composition of the present disclosure is administered once per month, twice per month, three times per month, every other week, once per week, twice per week, three times per week, four times per week, five times per week, six times per week, every other day, daily, twice a day, or three times a day.

Whilst the dosage of the pharmaceutical composition used will vary according to the activity of the particular chemokine receptor antagonistic modified peptide and the condition being treated, it may be stated by way of guidance that a dosage selected in the range from 0.01 to 500 mg/kg per body weight per dose, particularly in the range from 0.02 to 1 mg/kg of body weight per dose. On the other side, this dosage regime may be continued for however many days is appropriate to the patient in question, the daily dosages being divided into several separate administrations if desired.

Representative, nonlimiting acceptable doses for the chemokine receptor antagonistic modified peptide administrations are from about 0.01 mg/kg to about 500 mg/kg subject (patient) weight once to three times per week.

Representative, nonlimiting acceptable doses for Gemcitabine administrations are about 10 mg/kg to about 500 mg/kg subject (patient) weight once to three times per week In one embodiment, the combinations provided by this invention have been evaluated in certain assay systems, and in several different administrative schedules in vitro. The experimental details are as provided herein below. The data presented herein clearly indicate that the chemokine receptor antagonistic modified peptide particularly an ONCO P-8 when combined with a target drug exhibits synergistic effect. Furthermore, in one embodiment, the subject achieves a clinical benefit.

Additional specific embodiments of the present invention include, but are not limited to the following:

Example 1

Cell Lines

Human pancreatic cancer (PDAC) cell lines, BxPC3 and MIAPaCa2 were used in the present invention. Gemcitabine resistant BxPC3 cell line (BxPC3GR) was generated as a chemoresistant cell line against gemcitabine by culturing BxPC3 cells in media containing increasing concentrations of gemcitabine and then maintained them at 0.5 μM gemcitabine. Gemcitabine resistant MIAPaCa2 cell line (MIAPaCa2GR) was generated by culturing MIAPaCa2 cells in media containing increasing concentrations of gemcitabine and then maintained them at 0.12 μM gemcitabine. In a humidified cell culture incubator at 37° C. in 5% $CO_2$, BxPC3 and BxPC3GR are maintained in RPMI 1640 media with 10% FBS, 1% penicillin-streptomycin, 100 mM L-glutamine, 100 nM HEPES, 10 nM Sodium pyruvate and 25 nM Glucose. MIAPaCa2 and MIAPaCa2GR are maintained in DMEM with 10% FBS, 1% penicillin-streptomycin, and 1% L-Glutamine.

Example 2

Quantitating Expression Level of CXCR1, CXCR2 and CXCL8 Genes

Total RNA from cells was isolated by RNA Extraction Reagent (REzol™ C & T, Protech Technology Enterprise Co., Taiwan) and quantified by spectrophotometer (Nanodrop 1000, Thermo Scientific). Single-stranded cDNA was synthesized using PrimeScript RT Reagent Kit (Perfect Real Time) (RR037A, TAKARA Bio, Japan) according to the user manuals.

All real-time PCR reactions were performed with specific primers and taqman probes or probes from the Universal Probe Library (Roche Applied Science) in the StepOneTM-Real-Time PCR system (Applied Biosystems™). 18 s was used as an internal loading control. The reactions were performed as follows: denaturation for 2 min at 50° C. and 10 min at 95° C., 50 cycles of 95° C. for 15 sec, and 60° C. for 1 min. The gene expression was calculated by the following formula: gene expression=$2^{-\Delta\Delta Ct}$. Sequences of all primers used are listed below (F: Forward primer; R: Reverse primer):

TABLE 1

The primers and probes for quantitative real-time PCR.

| Primer/probe name | primer sequences | |
|---|---|---|
| CXCL8 forward primer | F: 5'-GAGCACTCCATAAGGCACAAA-3' | SEQ ID NO: 2 |
| CXCL8 reverse primer | R: 5'-ATGGTTCCTTCCGGTGGT-3' | SEQ ID NO: 3 |
| CXCL8 probe | UPL#72 | |
| CXCL1 forward primer | F: 5'-GACCAACATCGCAGACACAT-3' | SEQ ID NO: 4 |
| CXCL1 reverse primer | R: 5-TGCTTGTCTCGTTCCACTTG-3' | SEQ ID NO: 5 |
| CXCL1 probe | UPL#62 | |
| CXCL2 forward primer | F: 5'-GGCTAAGCAAAATGTGATATGTACC-3 | SEQ ID NO: 6 |
| CXCL2 reverse primer | R: 5'-CAAGGTTCGTCCGTGTTGTA-3' | SEQ ID NO: 7 |
| CXCL2 probe | UPL#41 | |
| ALDH1A1 forward primer | F: 5'-CACTGTGACTGTTTTGACCTCTG-3' | SEQ ID NO: 8 |
| ALDH1A1 reverse primer | R: 5'-TTTGGTGGATTCAAGATGTCTG-3' | SEQ ID NO: 9 |
| ALDH1A1 probe | UPL#14 | |
| BMI-1 forward primer | F: 5'-ACAAACTATGGCCCAATGCT-3' | SEQ ID NO: 10 |
| BMI-1 reverse primer | R: 5'-AACCATTGTTTGGATTTGGAA-3' | SEQ ID NO: 11 |
| BMI-1 probe | UPL#86 | |
| KLF4 forward primer | F: 5'-CGA TCG TCT TCC CCT CTT T-3' | SEQ ID NO: 12 |
| KLF4 reverse primer | R: 5'-GCC GCT CCA TTA CCA AGA-3' | SEQ ID NO: 13 |
| KLF4 probe | UPL#82 | |
| NESTIN forward primer | F: 5'-GTGCCGTCACCTCCATTAG-3' | SEQ ID NO: 14 |
| NESTIN reverse primer | R: 5'-CAGTAGTGCACCATCTCACTG-3' | SEQ ID NO: 15 |
| NESTIN probe | UPL#79 | |
| NANOG forward primer | F: 5'-GGTACGTGCTGAGGCCTTCT-3' | SEQ ID NO: 16 |
| NANOG reverse primer | R: 5'-ACAGGTGAAGACCTGGTTCC-3' | SEQ ID NO: 17 |
| NANOG probe | UPL#87 | |
| OCT4 forward primer | F: 5'-GAGGGGTTGAGTAGTCCCTTC-3' | SEQ ID NO: 18 |
| OCT4 reverse primer | R: 5'-GAAATCCGAAGCCAGGTGT-3' | SEQ ID NO: 19 |
| OCT4 probe | UPL#60 | |
| SOX2 forward primer | F: 5'-GCA GTA CAA CTC CAT GAC-3' | SEQ ID NO: 20 |
| SOX2 reverse primer | R: 5'-TGCTTGTCTCGTTCCACTTG-3' | SEQ ID NO: 21 |
| SOX2 probe | FAM-CGCAGACCTACATGAACGGC-BHQ1 | SEQ ID NO: 22 |

Example 3

ONCO P-8 can Inhibit the Invasion Ability of Human Pancreatic Cancer (PDAC) Cells The invasion ability of cell was performed by using 8 μm pore size transwell (Corning Fluor® Blok™). The transwell insert was coated with 60 μl matrigel (300 μg/ml in serum-free medium, BD Bioscience) overnight at 37° C. in 5% $CO_2$ atmosphere. $2.5 \times 10^4$ cells in 0.2 mL of serum-free growth medium were seeded into the upper chamber coated with matrigel and then treated with IL-8 (200 ng/ml) with/without ONCO P-8 (400 ng/ml). After incubation for 24 hrs at 37° C. in 5% $CO_2$, membrane of upper chamber was fixed with methanol and stained with propidium iodide (PI). The invasive cells in the bottom of membrane were imaged and counted by using an inverted fluorescence microscope (Observer.Z1, Zeiss) in five random fields of each specimen (magnification, ×100).

To investigate whether the cell invasion is adapted by CXCL8 (IL-8) or its signal, the present invention conduct the invasion experiments with ONCO P-8. The results of the present invention indicated that ONCO P-8 can reduce the invasive rate in BxPC-3 cell line. In addition, the data of the present invention also exhibit that CXCL8 (IL-8) can enhance the cell invasion. However, ONCO P-8 can neutralize the effect of CXCL8 to reduce the invasive rate in BxPC-3 (FIG. 1).

Example 4

ONCO P-8 can Inhibit the Colony Formation of Human Pancreatic Cancer (PDAC) Cells Cells were Seeded in a 24-Well Plate at a Density of 1000 Cells Per well, treatment were executed 24 hr after seeding. The treatment included that the cells were treated with IL-8 (200 ng/ml), IL-8 (200 ng/ml) plus ONCO P-8 (400 ng/ml), or ONCO P-8 (400 ng/ml). After 2 weeks, the medium was removed and cells were washed with PBS and stained for 30 min in 0.1% w/v crystal violet (dissolved in methanol; 32675, Fluka® Analytical, USA). Area of colonies were identified by camera and analyzed by ImageJ analysis software. The results were calculated as follows:

Colony formation rate (%)=(Treatment area of the colony/Control area of the colony)×100%

Figure 2:
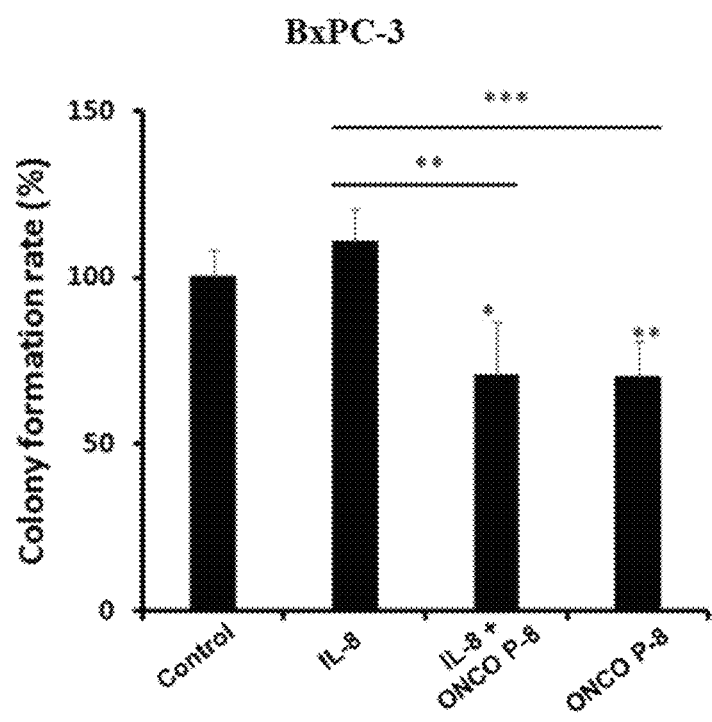
FIG. 2 depict ONCO P-8 can neutralize the effect of CXCL8 to reduce the colony formation rate in BxPC-3. Data are shown as mean±SD. P<0.01; *P<0.001, student's t-test.

The data of the colony formation of PDAC cells also exhibit that CXCL8 (IL-8) can enhance the cell invasion. On the other side, ONCO P-8 can neutralize the effect of CXCL8 to reduce the colony formation rate in BxPC-3 (FIG. 2).

Example 5

Validating Gemcitabine-Resistant Cancer Cell Lines

To validate the establishment of Gemcitabine-resistant pancreatic ductal adenocarcinoma (PDAC) cell lines, MTT of Gemcitabine gradient was implemented with parental cells and Gemcitabine-resistant (GR) cells.

Figure 3A:
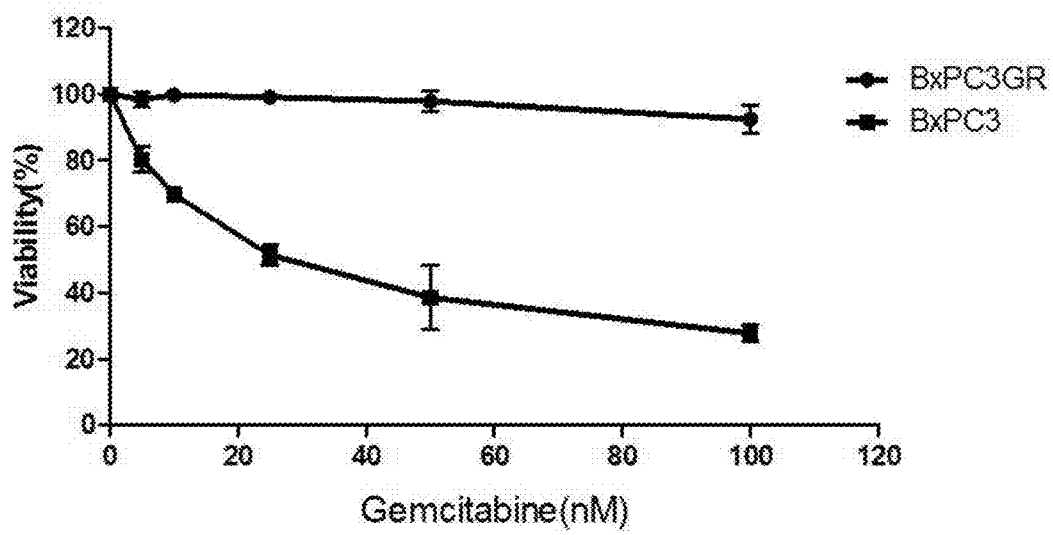
FIG. 3A-3B illustrate the establishment of Gemcitabine-resistant pancreatic ductal adenocarcinoma (PDAC) cell lines.
Figure 3B:
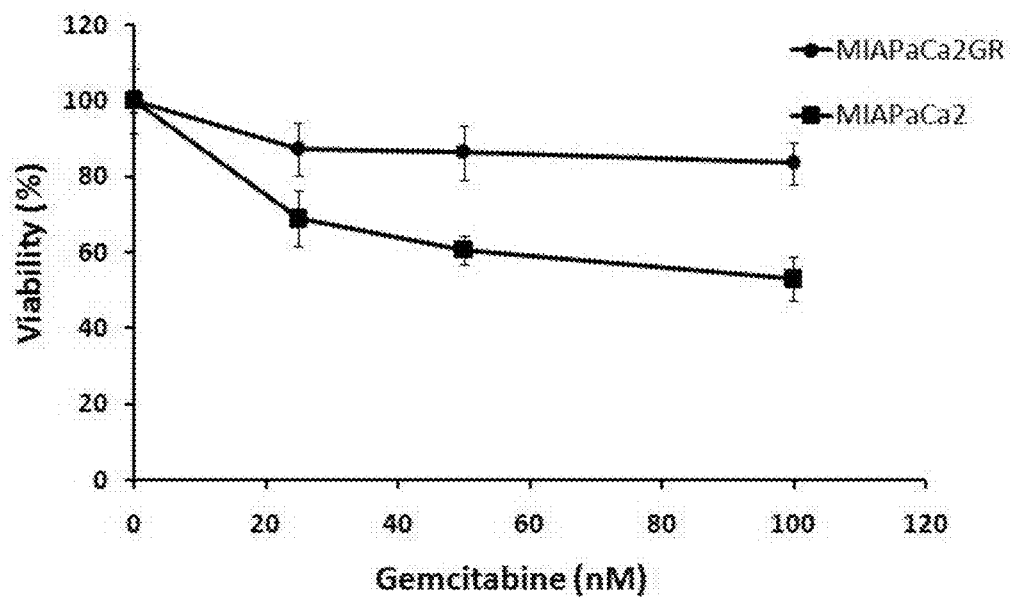

BxPC-3 and BxPC-3GR treated with gemcitabine from 0 nM to 100 nM, and measured by MTT (FIG. 3a). Similarly, MIAPaCa2 and MIAPaCa2GR also treated with gemcitabine from 0 nM to 100 nM, and measured by MTT (FIG. 3b).

The drug-tolerance of GR cell lines show much higher than parental cells by 34-39 order (Table 1). The $IC_{50}$-value of Gemcitabine in BxPC-3 cells was 6.128 nM, as compared to 236.3 μM in BxPC-3GR cells (38.6-fold resistance). The $IC_{50}$-value of Gemcitabine in MIAPaCa2 cells was 250.7 nM, as compared to 8620 nM in MIAPaCa2GR cells (34.4-fold resistance).

TABLE 2

Cytotoxicity of Gemcitabine in parental and Gemcitabine-resistant cell lines.

| Cell lines | $IC_{50}$ (nM) Parental cells | $IC_{50}$ (nM) Resistant cells | Fold resistance |
|---|---|---|---|
| BxPC-3 | 6.128 | 236.3 | 38.6 (fold) |
| MIAPaCa2 | 250.7 | 8620 | 34.4 (fold) |

Example 6

Figure 4A:
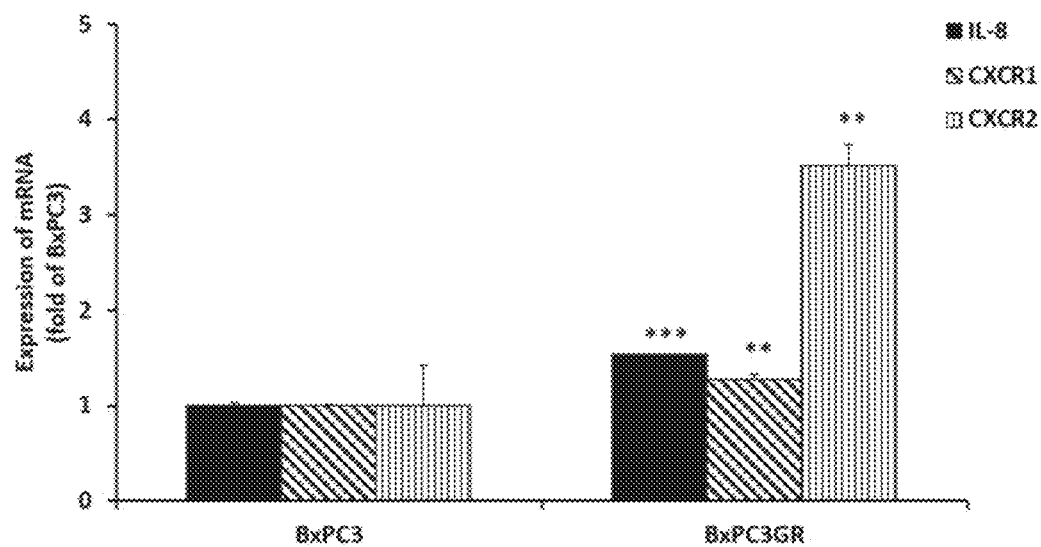
FIG. 4A-4B illustrate IL-8, CXCR1 and CXCR2 mRNA expression of parental cells and Gemcitabine-resistant cells via Gemcitabine administrated.
Figure 4B:
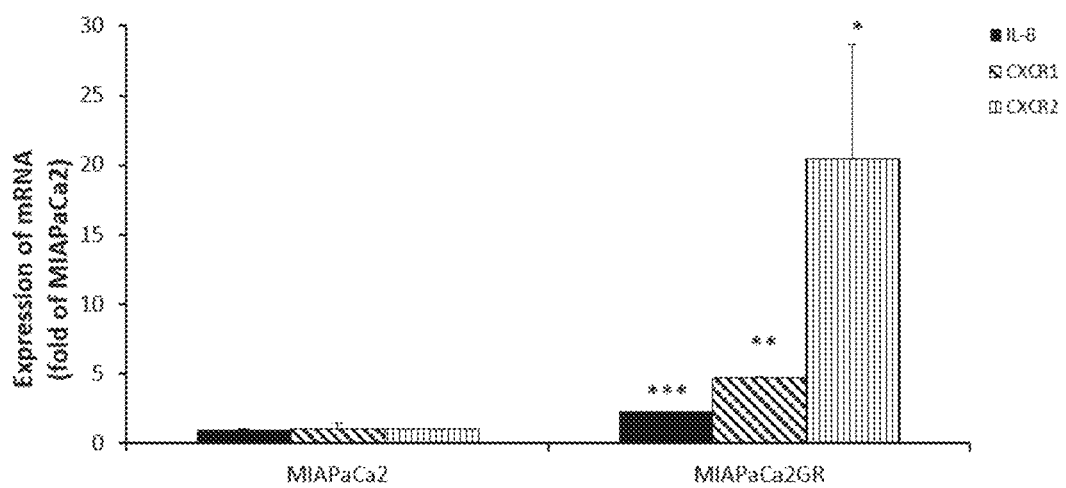

Expression Level of CXCL8, CXCR1 and CXCR2 Genes with/without Gemcitabine-Induced in Gemcitabine-Resistant Cancer Cells Compared with in Parental Cancer Cells Please refer to FIG. 4A-4B, parental and Gemcitabine-resistant BxPC3 and MIAPaCa2 were collected to check IL8, CXCR1 and CXCR2 mRNA expression by Q-PCR. GR cell lines show significantly higher expression compared to parental cells. In other words, CXCL8 (IL-8) mRNA, CXCR1 mRNA and CXCR2 mRNA expression of GR cells (BxPC-3GR (FIG. 4A) and MIAPaCa2GR (FIG. 4B)) parental cells (BxPC-3 (FIG. 4A) and MIAPaCa2 (FIG. 4B)) significantly enhance respectively. Data are shown as mean±SD. *P<0.05; P<0.01; *P<0.001, student's t-test.

Example 7

ONCO P-8 can Attenuate High IL-8/CXCR1/CXCR2 Gene Expression of Gemcitabine-Resistant PDAC Cell Lines Further, the present invention also demonstrated that the Gemcitabine-resistant cancer cells were treated by 0.1 μM Gemcitabine combined with ONCO P-8 (400 ng/mL) for 1 month, then IL-8, CXCR1 and CXCR2 mRNA expression of BxPC-3GR (FIG. 5A) and MIAPaCa2GR (FIG. 5B)) are decreased. Data are shown as mean±SD. *<0.05; P<0.01; *P<0.001, student's t-test. That is to say, ONCO P-8 can compete with IL-8 and attenuate its feedback to regulate gene expression of IL-8, CXCR1 and CXCR2 decreased.

Example 8

ONCO P-8 can Inhibit the Invasion Ability of Gemcitabine-Resistant PDAC Cells

The Gemcitabine-resistant cancer cells treated by Gemcitabine (100 nM) with ONCO P-8 (400 ng/mL), or treated by Gemcitabine with ONCO P-8 and IL-8 (200 ng/mL), or treated by Gemcitabine with IL-8 respectively for invasion ability assay.

Figure 6A:
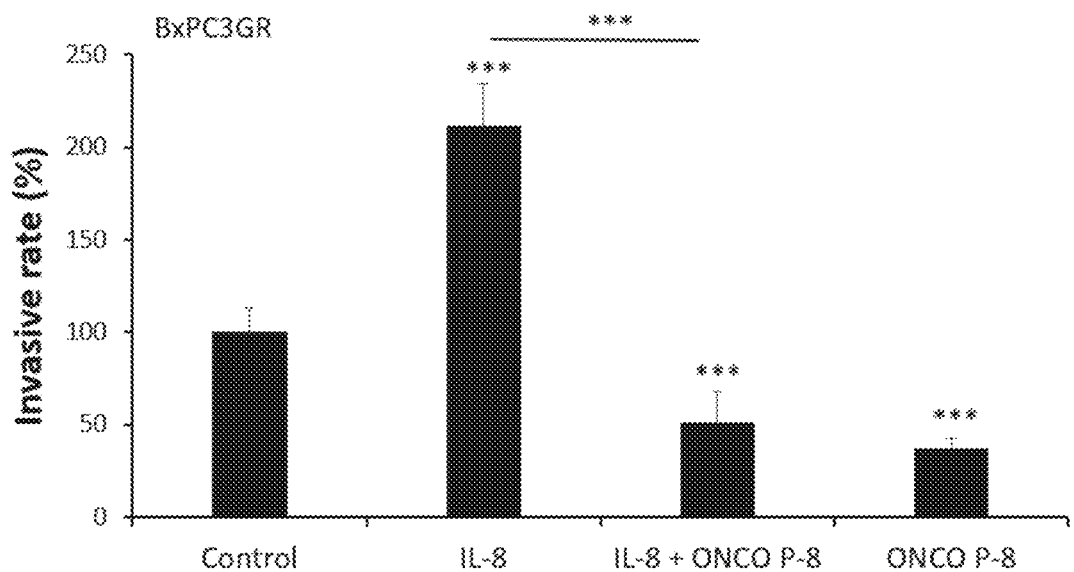
FIG. 6A-6B illustrate ONCO P-8 can inhibit the invasion ability of Gemcitabine-resistant PDAC cells.
Figure 6B:
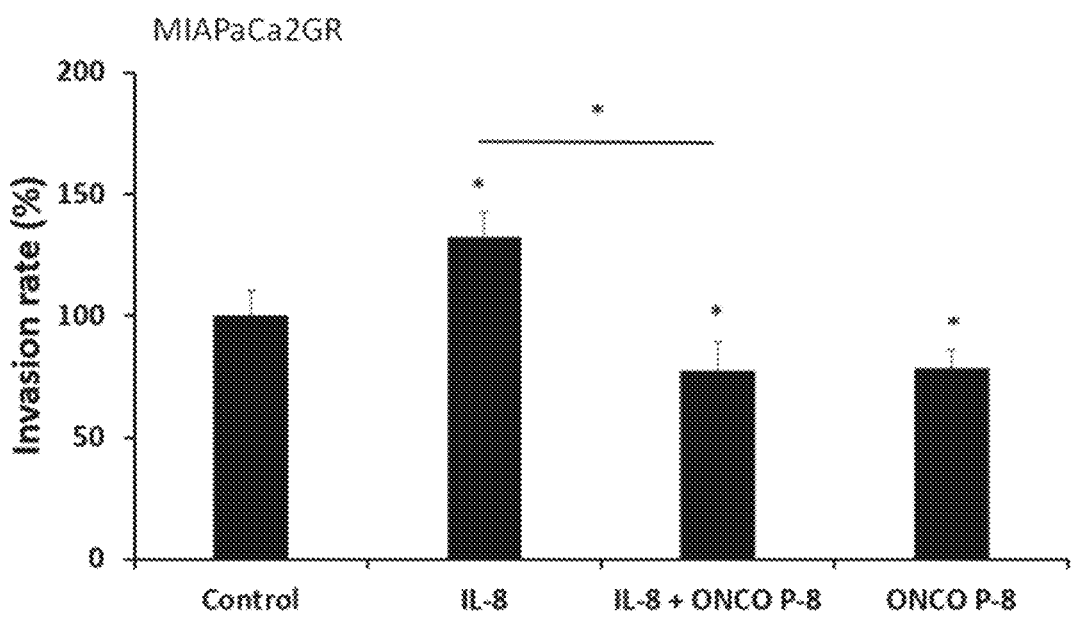

The results of transwell invasion assays show ONCO P-8 decreases invasion rate compared with control group in BxPC-3GR (FIG. 6A) and MIAPaCa2GR (FIG. 6B). Meanwhile, it can prevent significantly invasion rate of "IL-8+ ONCO P-8 group" in BxPC-3GR (FIG. 6A) and MIAPaCa2GR (FIG. 6B) compared with "IL-8 group" in BxPC-3GR (FIG. 6A) and MIAPaCa2GR (FIG. 6B). Data are shown as mean±SD. *P<0.05; **P<0.01, student's t-test.

Example 9

The Proliferation Rate of Gemcitabine-Resistant Cancer Cells can be Inhibited by ONCO P-8

Figure 5A:
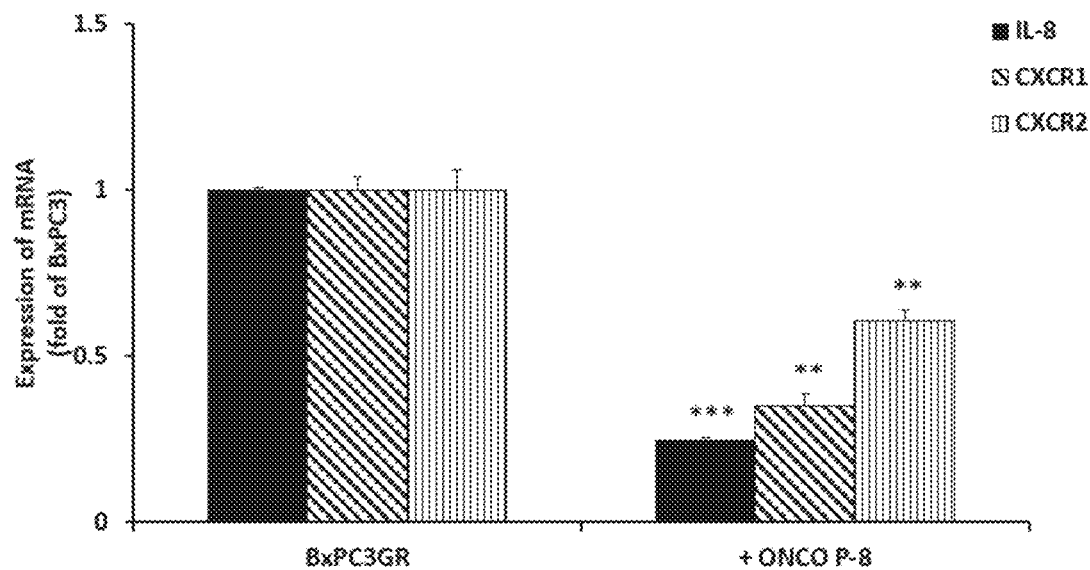
FIG. 5A-5B illustrate IL-8, CXCR1 and CXCR2 mRNA expression of Gemcitabine-resistant cells via Gemcitabine administrated or Gemcitabine with ONCO P-8 administrated.
Figure 5B:
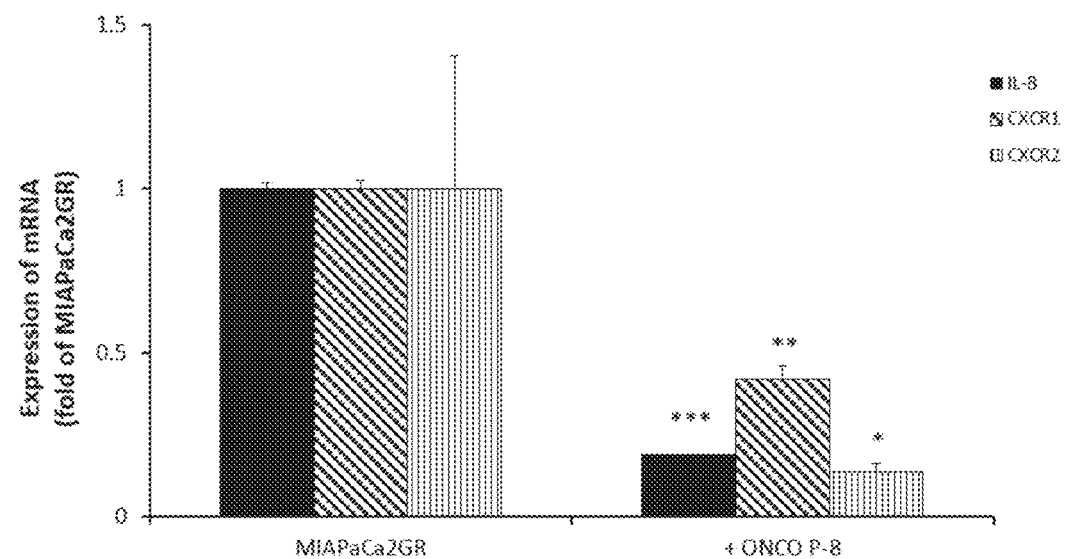
Figure 7:
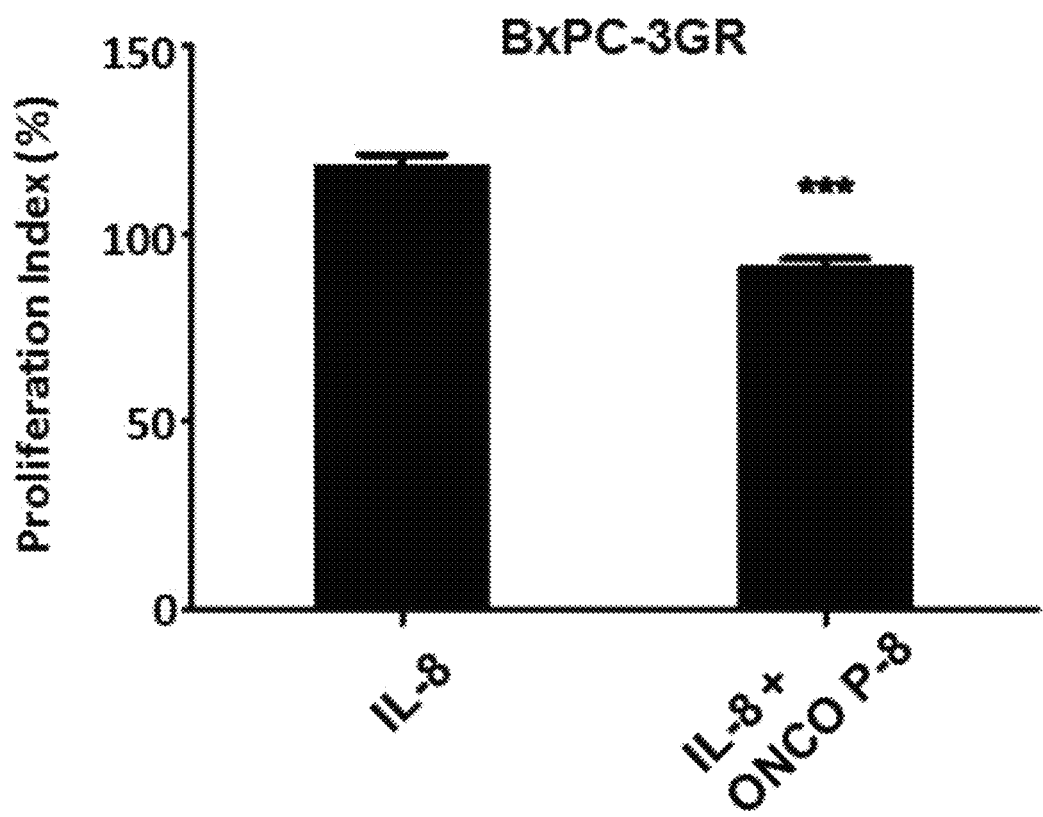
FIG. 7 illustrates the proliferation rate of Gemcitabine-resistant cancer cells can be enhanced by Gemcitabine and inhibited by ONCO P-8.

Cell proliferation assay was performed using cell counting kit-8 (CCK-8) (Dojindo, Kumamoto, Japan). The Gemcitabine-resistant cancer cells treated by Gemcitabine (100 nM) with ONCO P-8 (400 ng/mL, 47 nM), or treated by Gemcitabine with ONCO P-8 and IL-8 (200 ng/mL, 23.8 nM) for 24 hours. The proliferative rate of Gemcitabine-resistant cancer cells significantly attenuated in BxPC-3GR (FIG. 7), compared with IL-8 group (FIG. 7). Data are shown as mean±SD. *P<0.05; P<0.01; *P<0.001, student's t-test. These data further confirm that cancer cells co-treated with Gemcitabine and ONCO P-8 resulted in down-regulation of CXCL8, CXCR1 and CXCR2 (FIG. 5A-5B).

Example 10

Figure 8A:
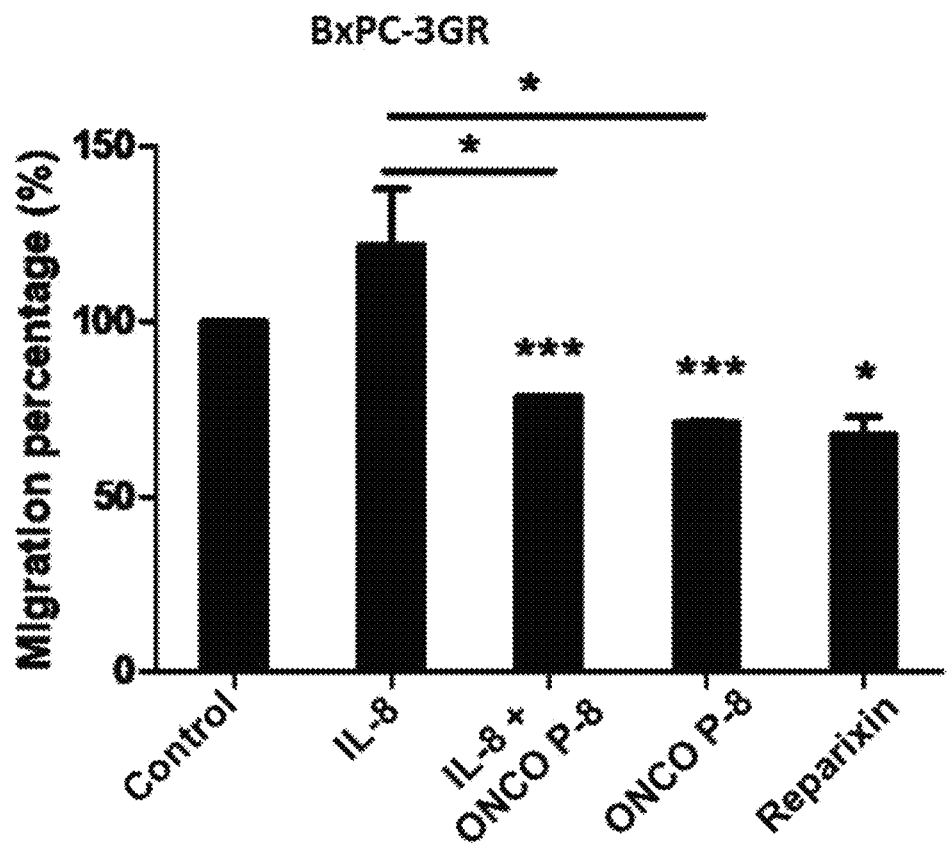
FIG. 8A-8B illustrate ONCO P-8 can attenuate migration rate (FIG. 8A) and invasion rate (FIG. 8B) of Gemcitabine-resistant cancer cells.
Figure 8B:
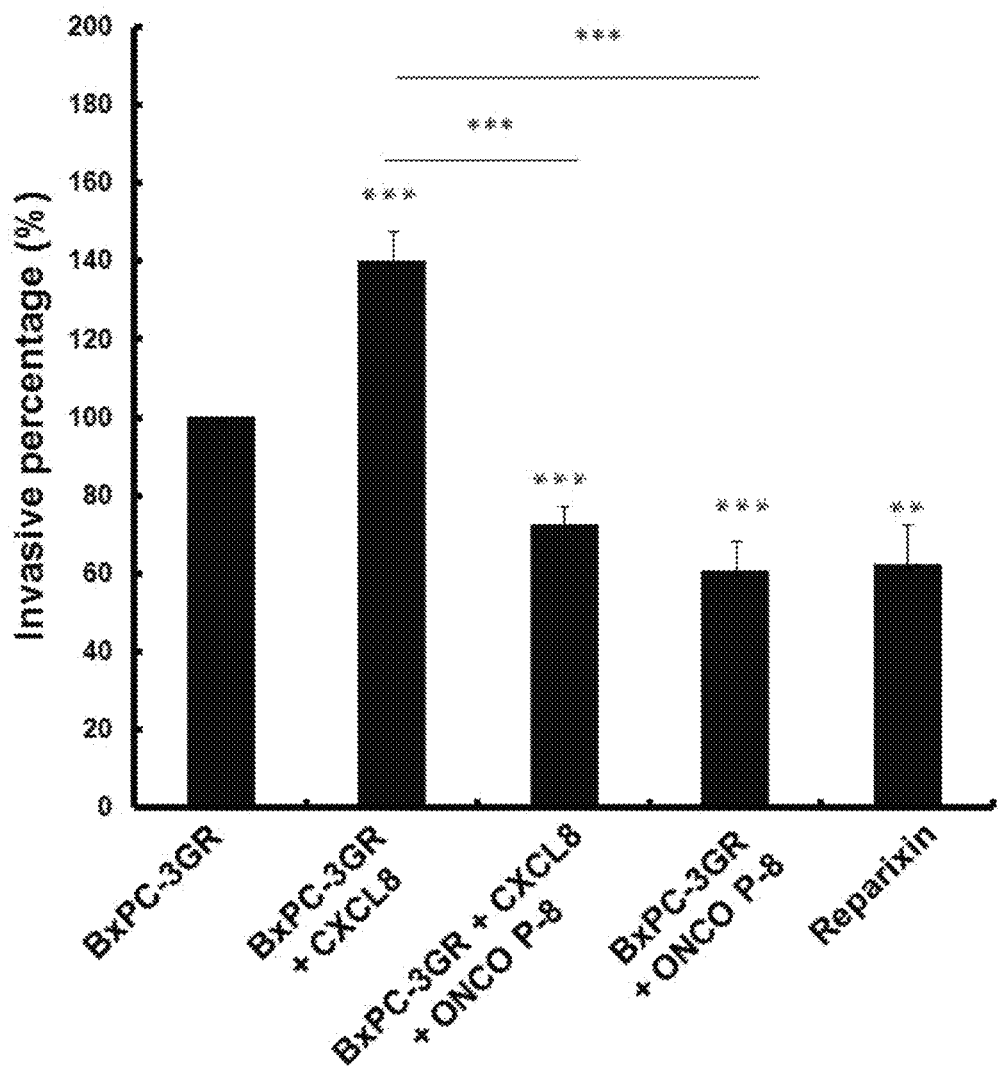
Figure 10A:
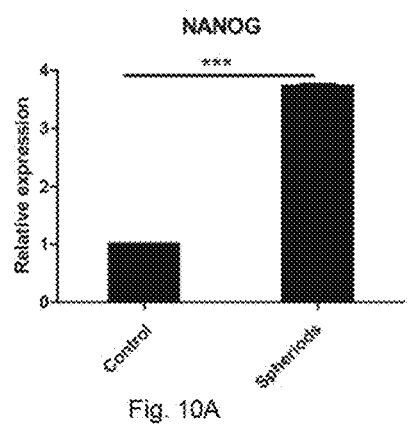
FIG. 10A-10G illustrate RNA expression analysis of the key transcription factors NANOG (FIG. 10A), OCT4 (FIG. 10B), SOX2 (FIG. 10C), ALDHA1 (FIG. 10D), BMI-1 (FIG. 10E), KLF4 (FIG. 10F) and Nestin (FIG. 10G) in BxPC3GR cells and BxPC3GR-derived spheroids via RT-PCR. Drug resistance related CSC marker: NANOG, OCT4, SOX2. Cell invasion related CSC marker: ALDHA1, BMI-1. Tumor growth related CSC marker: KLF4, Nestin. *P<0.05; P<0.01; *P<0.001, student's t-test.
Figure 10B:
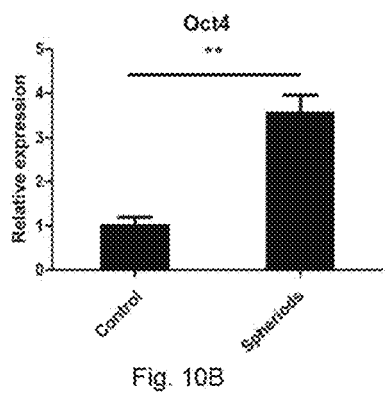
Figure 10C:
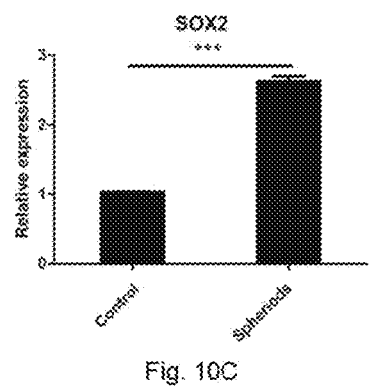
Figure 10D:
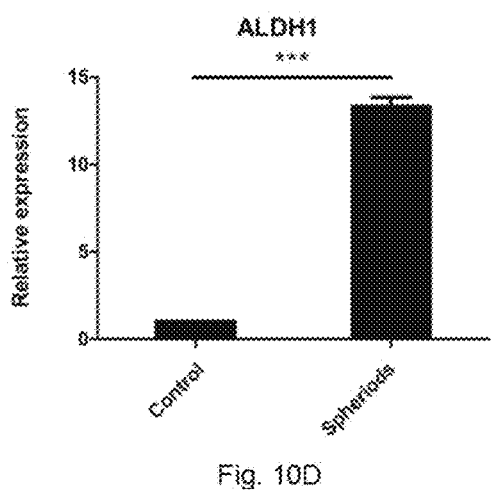
Figure 10E:
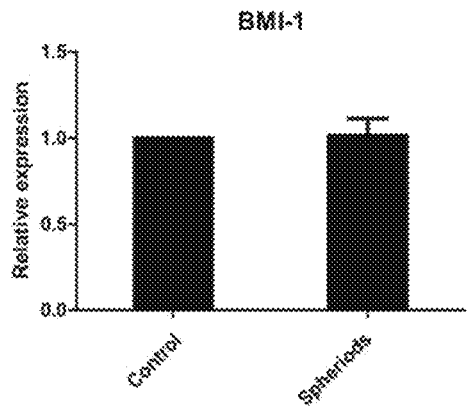
Figures 10F, 10G:
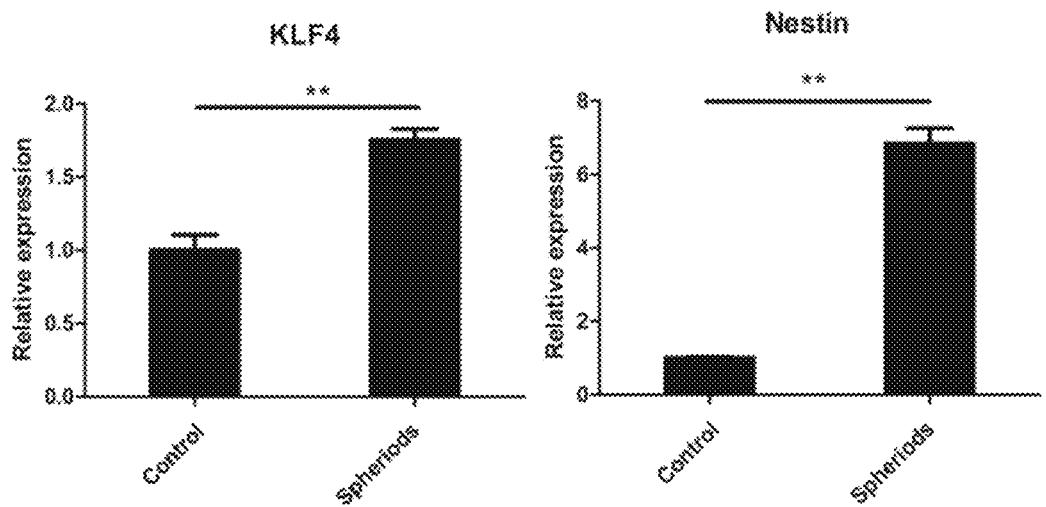
Figure 11:
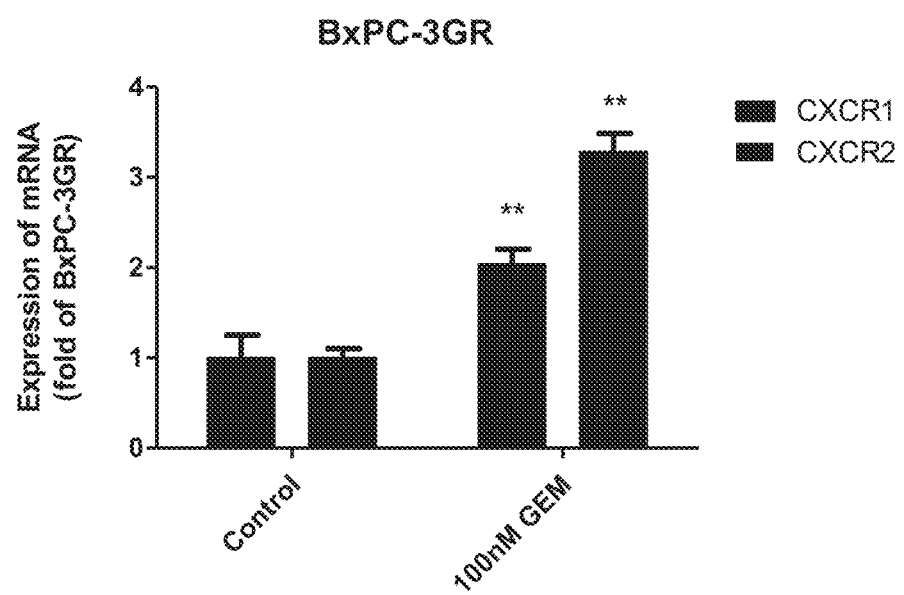
FIG. 11 illustrate CXCR1/CXCR2 mRNA expression in BxPC3GR-derived spheroids after 100 nM Gemcitabine (GEM) treated. *P<0.05; P<0.01; *P<0.001, student's t-test.
Figure 12A:
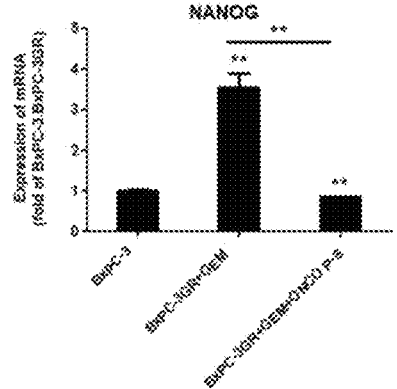
FIG. 12A-12G illustrate RT-PCR analysis was performed to determine the effect of ONCO P-8 treatment on the expression levels of NANOG (FIG. 12A), OCT4 (FIG. 12B), SOX2 (FIG. 12C), ALDHA1 (FIG. 12D), BMI-1 (FIG. 12E), KLF4 (FIG. 12F) and Nestin (FIG. 12G) in BxPC3GR-derived spheroids with Gemcitabine. Drug resistance related CSC marker: NANOG, OCT4, SOX2. Cell invasion related CSC marker: ALDHA1, BMI-1. Tumor growth related CSC marker: KLF4, Nestin. The drug concentration: ONCO P-8 (400 ng/ml; i.e. 47 nM), Gemcitabine (100 nM). *P<0.05; P<0.01; *P<0.001, student's t-test.
Figure 12B:
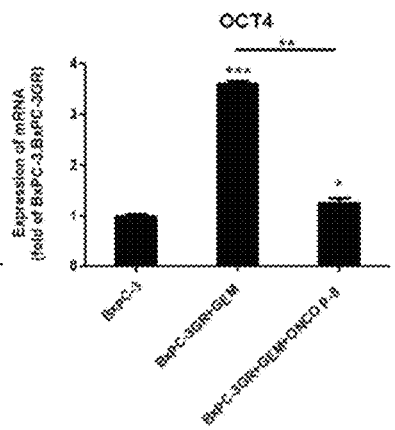
Figure 12C:
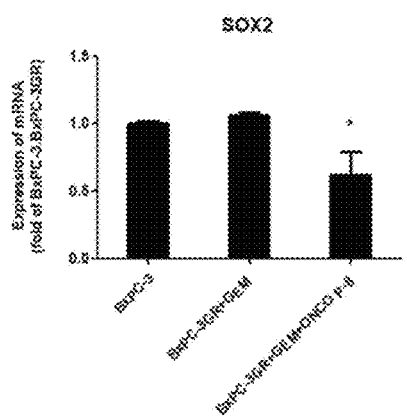
Figure 12D:
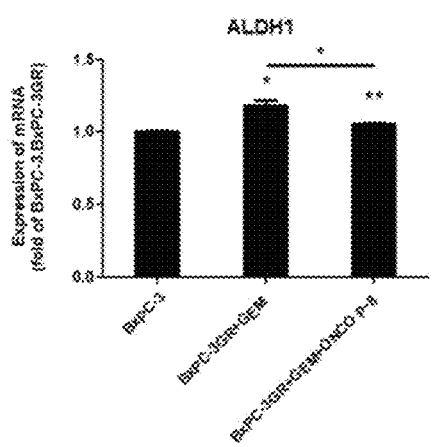
Figure 12E:
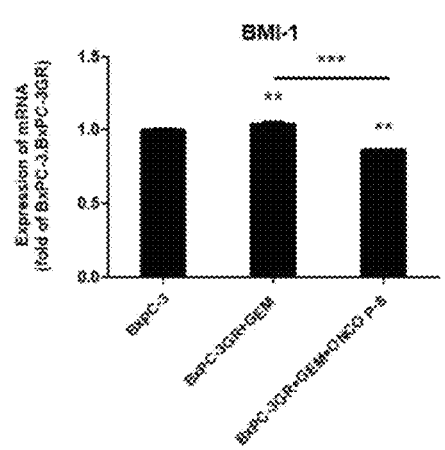
Figure 12F:
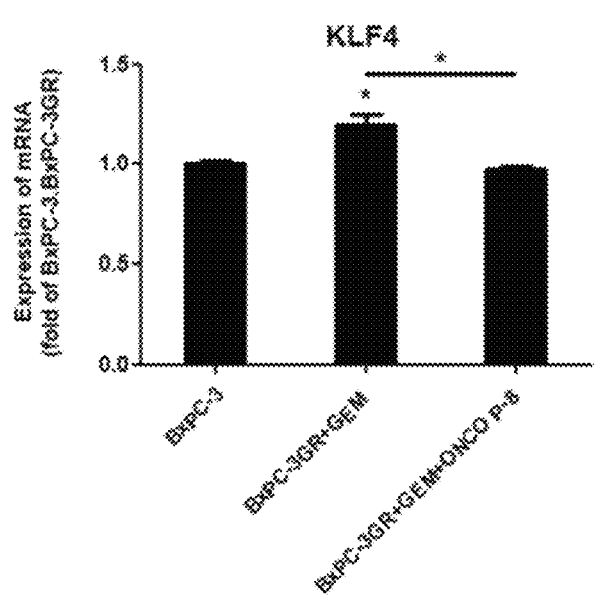
Figure 12G:
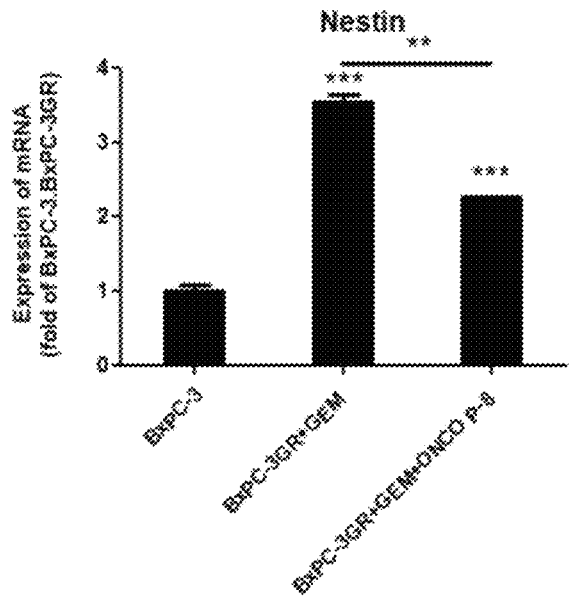

ONCO P-8 can Attenuate Migration Ability and Invasion Ability of Gemcitabine-Resistant Cancer Cells Moreover, the present invention also demonstrated that ONCO P-8 can reduce the migration rate (FIG. 8A) and the invasive rate (FIG. 8B) in gemcitabine-resistant cell. Additionally, the results of the present invention also exhibit that CXCL8 can enhance the cell migration and invasion. However, ONCO P-8 can neutralize the effect of CXCL8 to reduce the invasive rate in BxPC-3GR. The drug concentration: ONCO P-8 (400 ng/ml), Reparixin (200 nM), IL-8 (200 ng/ml), statistical significance: *P<0.05, P<0.01, *P<0.001.

Example 11

Comparisons of Cell Morphology and Gene Expression were Between Gemcitabine-Resistant Cancer Cells and Spheroids Derived from Gemcitabine-Resistant Cancer Cells Although chemotherapy kills most cells in a tumor, it is believed to leave tumor stem cells behind, which might be an important mechanism of resistance.

To investigate that the drug-resistance is accomplish with CXCR1 and CXCR2, then analyzing some properties of cancer stem cell (CSC) properties on BxPC-3GR (FIG. 9A-FIG. 9C, FIG. 10A-FIG. 10G, FIG. 11, FIG. 12A-FIG. 12G).

Cell morphology of BxPC-3GR parental cells (FIG. 9A) and spheroids derived from BxPC-3GR (FIG. 9B). Gray arrows revealed BxPC-3-GR derived spheroids. RNA expressions of CXCR1 and CXCR2 on spheroids derived from BxPC-3GR were higher than parental BxPC-3GR cells (FIG. 9C).

Further, the data show that markers of CSC properties will be evaluated higher in BxPC3GR-derived spheroids than in BxPC3GR parental cells (FIG. 10A-FIG. 10G). This result revealed CSC tendency will assistant the cell to resistant to the chemical therapy. Moreover, inhibit the CXCR1/CXCR2 with ONCO P-8 can reduce the expression of these CSC properties markers. These results also indicate ONCO P-8 may prevent cancer cell from the chemotherapy resistance via inhibiting CSC transform.

In other words, the present invention demonstrated that ONCO P-8 could inhibit the cell proliferation, survival, invasion, migration and CSC markers in pancreatic cancer cells, and revealed the functional properties of ONCO P-8 via IL-8R (CXCR1/CXCR2) overexpression in cancer cells.

Example 12

Figure 13A:
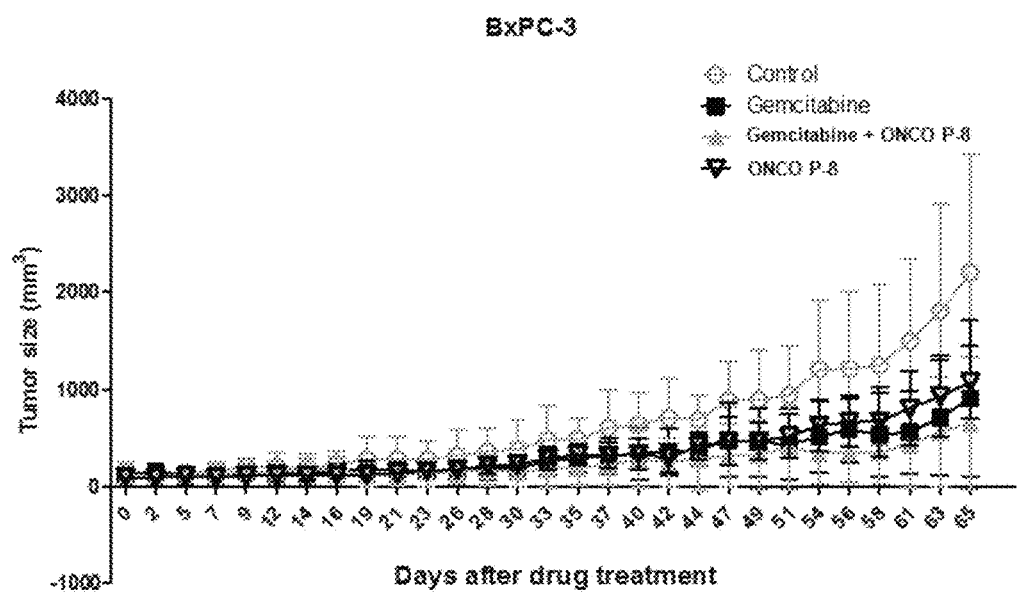
FIG. 13A-13C illustrate ONCO P-8 and Gemcitabine combined usage inhibits tumor growth and prolongs lifespan in the PDAC xenograft tumor model. The PDAC xenograft tumor model treated by ONCO P-8, or treated by Gemcitabine with ONCO P-8, or treated by Gemcitabine, or treated by Gemcitabine, or treated PBS respectively. Gemcitabine administrations were about 100 mg/kg subject weight twice per week. ONCO P-8 administrations were about 500 µg/kg subject weight three times per week.
Figure 13B:
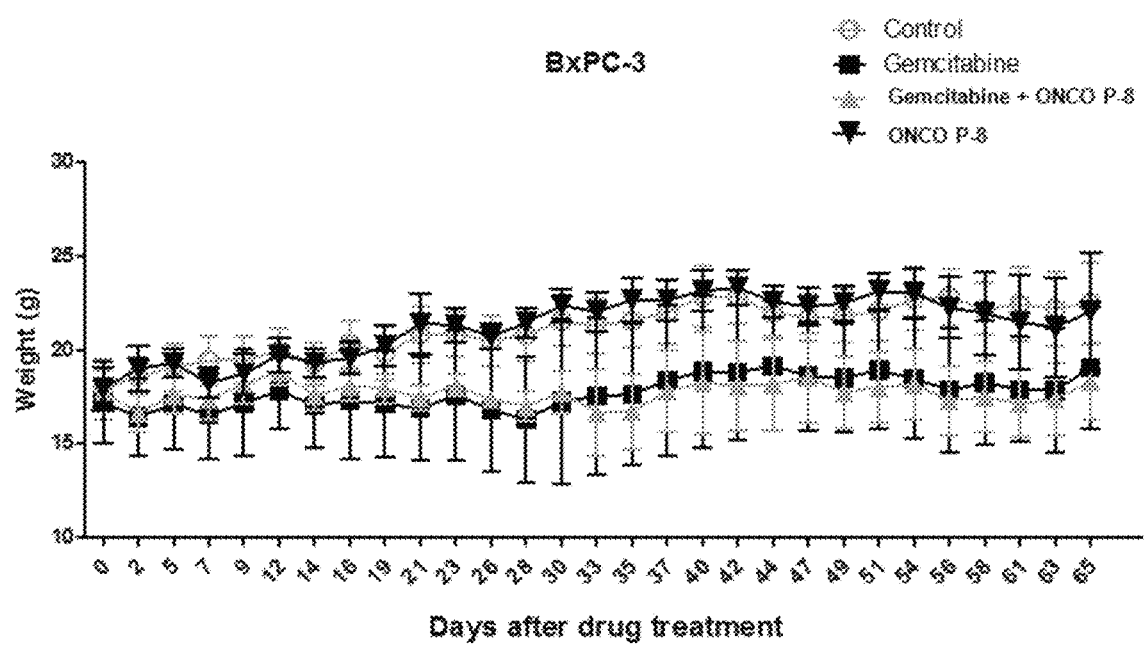
Figure 13C:
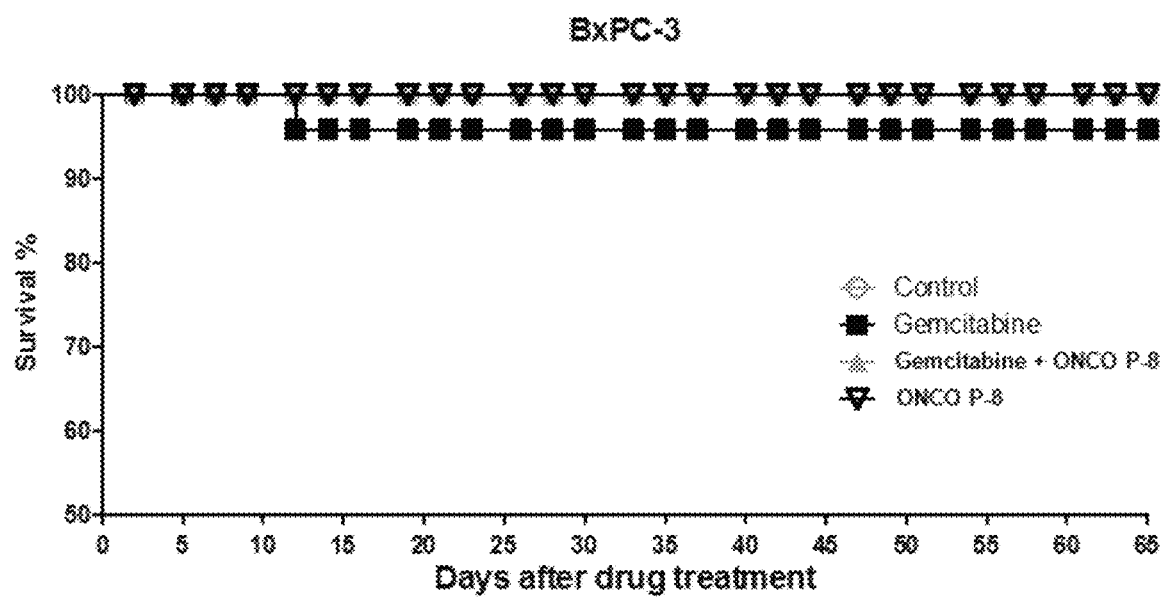

ONCO P-8 and Gemcitabine Combined Usage Inhibits Tumor Growth and Prolongs Lifespan In Vivo To evaluate the effect of ONCO P-8 in vivo, it was used the BxPC-3 model in 4-week old male BALB/c nude mice in the present invention. Mice were inoculated BxPC-3 cells subcutaneously. After 7 days, mice were treated with PBS or ONCO P-8 (500 µg/kg) by i.p injection three times a week. The initiation tumor size was 128.5±47.8 mm³ in first treatment. It was found that ONCO P-8 significantly inhibited the tumor growth in vivo (FIG. 13A). Additionally, treatment of ONCO P-8 didn't lead to reduce the body weight of mice (FIG. 13B), meaning that ONCO P-8 might have no toxicity effect in vivo. These results demonstrated that ONCO P-8 could significantly suppress the tumor growth and improve the survival rate of BALB/c nude mice (FIG. 13C).

Example 13

Figure 14A:
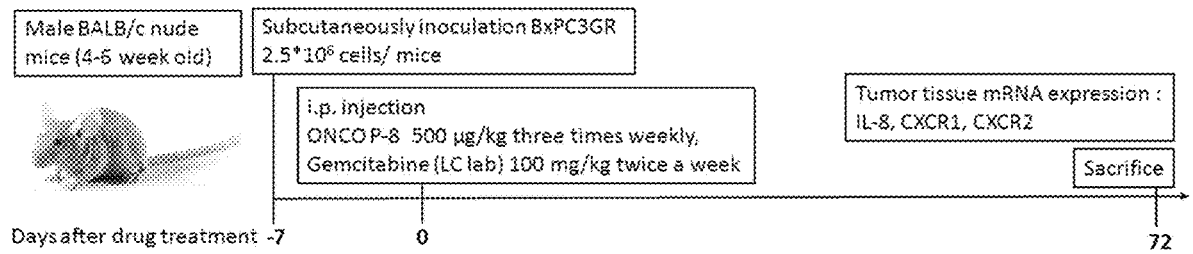
FIG. 14A-14D illustrate ONCO P-8 and Gemcitabine combined usage inhibits Gemcitabine-resistant tumor growth and prolongs lifespan in the Gemcitabine-resistant PDAC xenograft tumor model. The Gemcitabine-resistant PDAC xenograft tumor model treated by Gemcitabine with ONCO P-8, or treated by Gemcitabine respectively. Gemcitabine administrations were about 100 mg/kg subject weight twice per week via Intraperitoneal (IP) Route. ONCO P-8 administrations were about 500 µg/kg subject weight three times per week via Intraperitoneal (IP) Route.

ONCO P-8 and Gemcitabine Combined Usage Inhibits Gemcitabine-Resistant Tumor Growth and Prolongs Lifespan In Vivo Further, it was established a nude mice xenografts model with BxPC3GR cell lines (FIG. 14A). Male BALB/c mice aged 4 to 6-weeks were purchased from the (BioLASCO Taiwan Co., Ltd). 2.5×10⁶ BxPC-3GR cells (suspend in cold PBS to a final concentration of 1.2×10⁷ cells/ml) in 0.2 ml PBS mixed equal volume matrigel were injected subcutaneously into the back of each mouse (n=8 for each group). After inoculation a week, "Gemcitabine group" i.p. inject gemcitabine (Gemcitabine Hydrochloride Salt >99%, G4177, LC laboratories) twice a week. ONCO P-8 (500 µg/kg) was administered by intraperitoneal (i.p.) injection 3 times a week in the "ONCO P-8+Gemcitabine group". The drug was treated after 72 days, then the mice were all sacrificed.

Figure 14B:
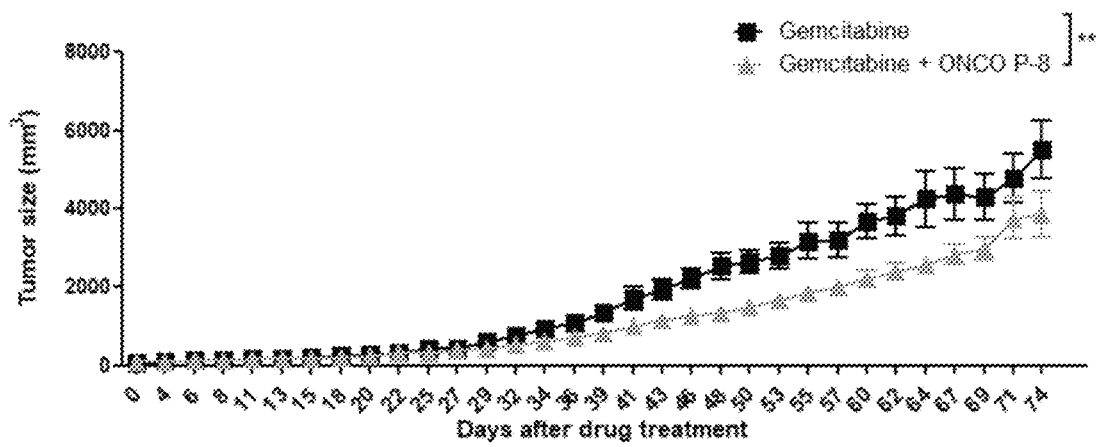
Figure 14C:
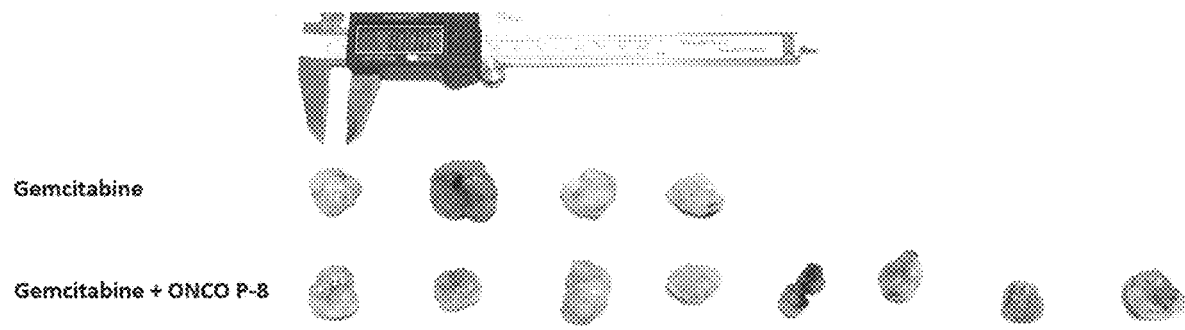
Figure 14D:
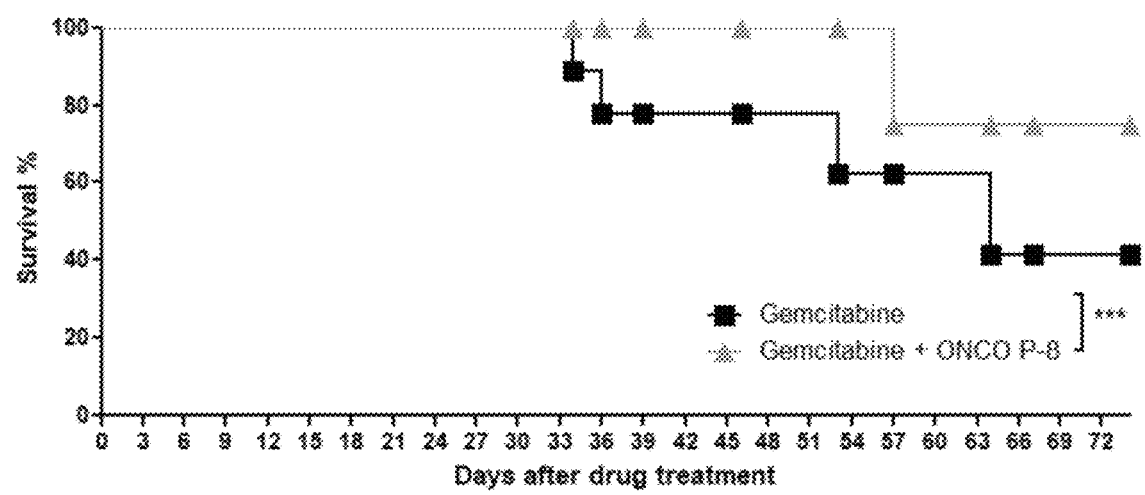

The tumor size of the "ONCO P-8 combined with Gemcitabine group" significantly reduces compared to the "Gemcitabine group" (FIG. 14B, FIG. 14D). Tumor volumes were all calculated as the following formula: Tumor size (mm³)=0.52×(Width²×length). The results were shown as tumor size±SEM.

On the other side, the survival rate of the "ONCO P-8+Gemcitabine group" also effectively enhanced by 30% compared to the "Gemcitabine group" until Day 72 (FIG. 14C). After sacrificed, the mRNA expressions of tumor tissue are examined.

Example 14

Figure 15A:
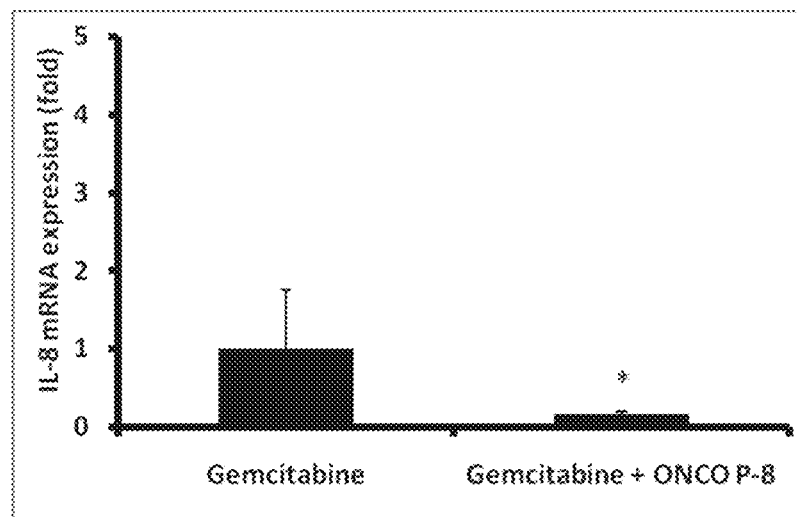
FIG. 15A-15C show ONCO P-8 and Gemcitabine combined usage attenuates IL-8, CXCR1 and CXCR2 mRNA expression in Gemcitabine-resistant PDAC xenograft tumor model.
Figure 15B:
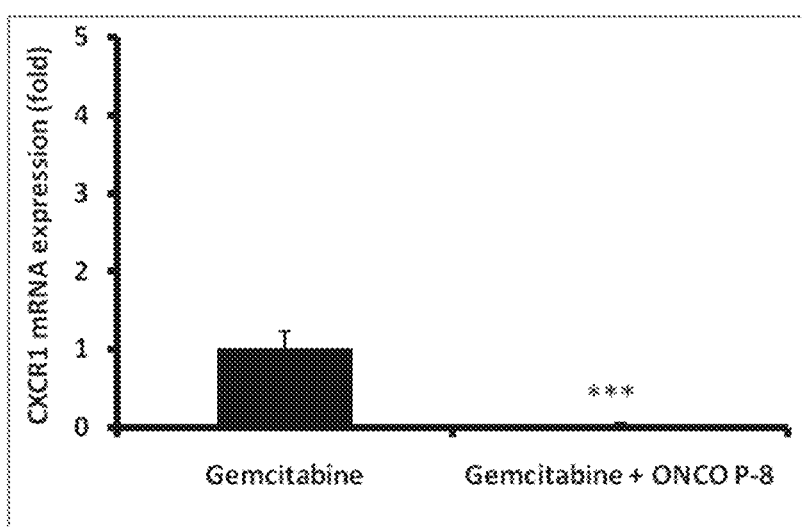
Figure 15C:
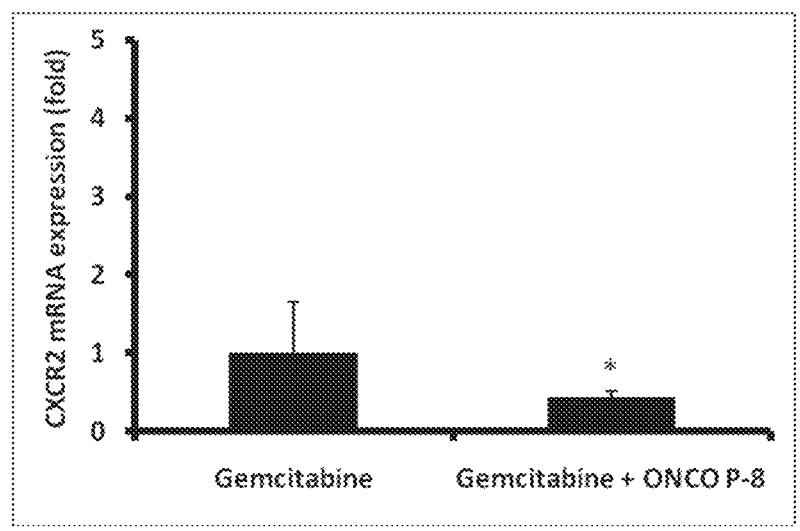

ONCO P-8 and Gemcitabine Combined Usage Attenuates IL-8, CXCR1 and CXCR2 mRNA Expression in Gemcitabine-Resistant Tumor Model After BxPC-3GR tumor-bearing BALB/c nude mice were sacrificed at Day 72, the IL-8, CXCR1 and CXCR2 mRNA expressions of tumor tissue are examined in "Gemcitabine group" and "Gemcitabine+ONCO P-8 group" (FIG. 15A-15C). The results show significantly decreased between the "Gemcitabine+ONCO P-8 group" and the "Gemcitabine group" by decreasing the gene expression of IL-8 (FIG.

15A), CXCR1 (FIG. 15B), and CXCR2 (FIG. 15C). Data are shown as mean±SEM (n=8). *P<0.05; P<0.01; *P<0.001, student's t-test.

Example 15

Comparing the Antagonism Between ONCO P-8 and IL-8 for Binding with CXCR1 and CXCR2

Figure 16A:
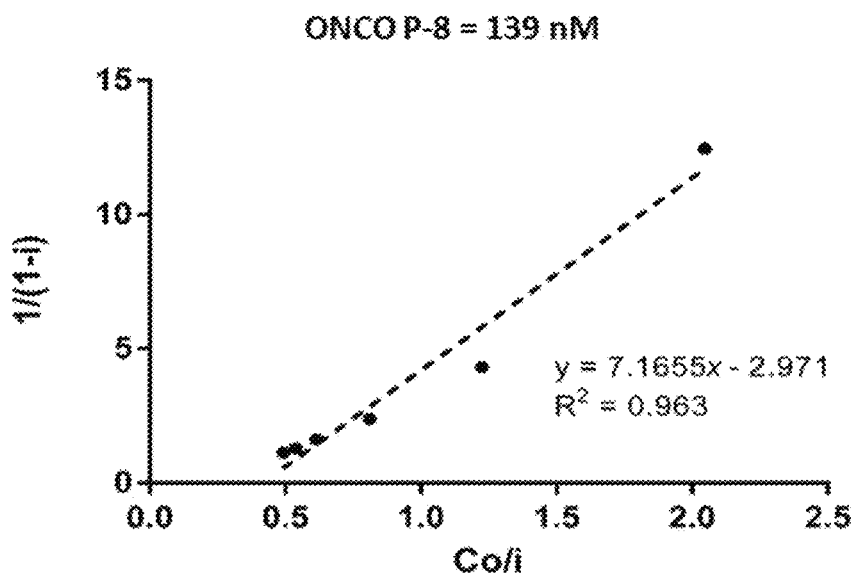
FIG. 16A-16B show the binding capacity of ONCO P8-CXCR2 complex formation compared with IL-8-CXCR2 complex formation.
Figure 16B:
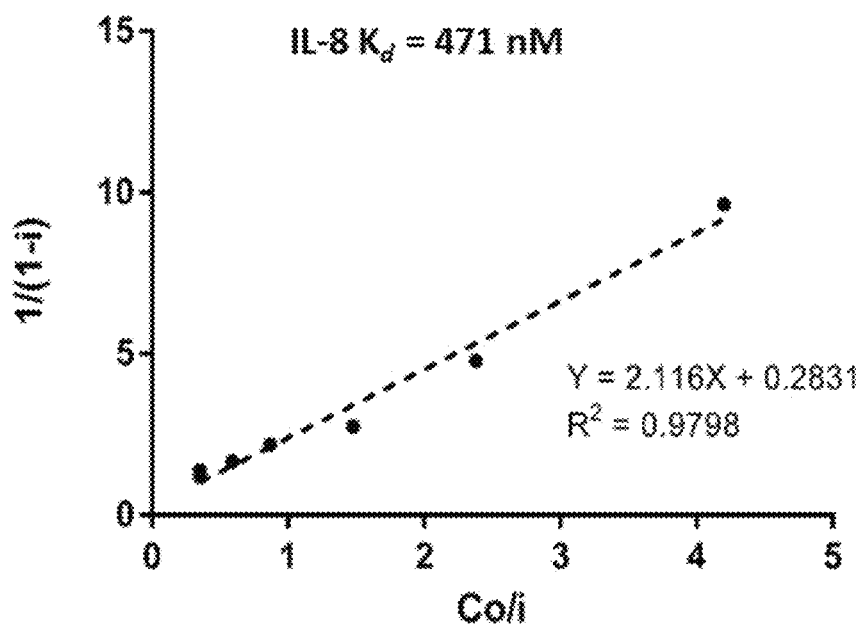

On the other hand, the present invention demonstrated via indirect ELISA for measuring ONCO P8-CXCR2 and IL-8-CXCR2 complex formation. The ELISA binding assay indicated that ONCO P-8 (FIG. 16A) could bind to CXCR2 tighter 3-4 fold than IL-8 (FIG. 16B). The $K_d$ value of ONCO P8 was 139 nM. The $K_d$ value of IL-8 was 471 nM.

Figure 17A:
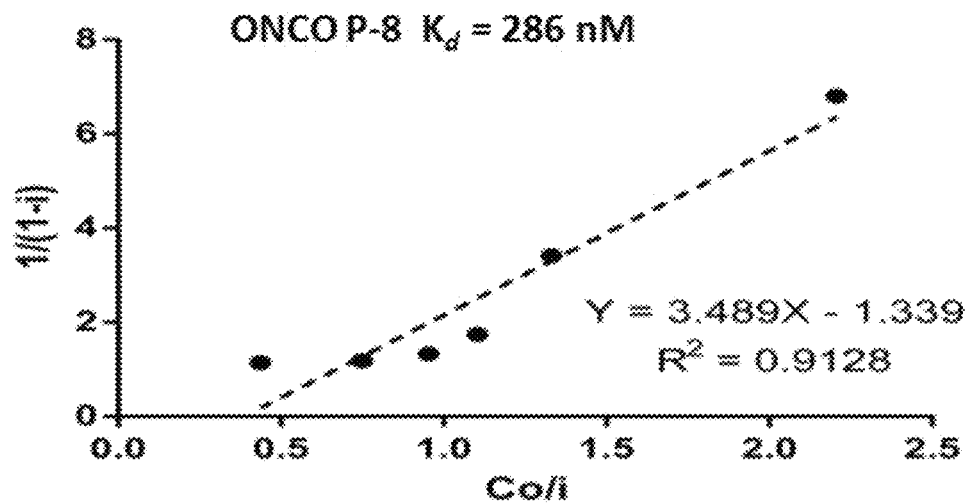
FIG. 17A-17B show the binding capacity of ONCO P8-CXCR1 complex formation compared with IL-8-CXCR1 complex formation.
Figure 17B:
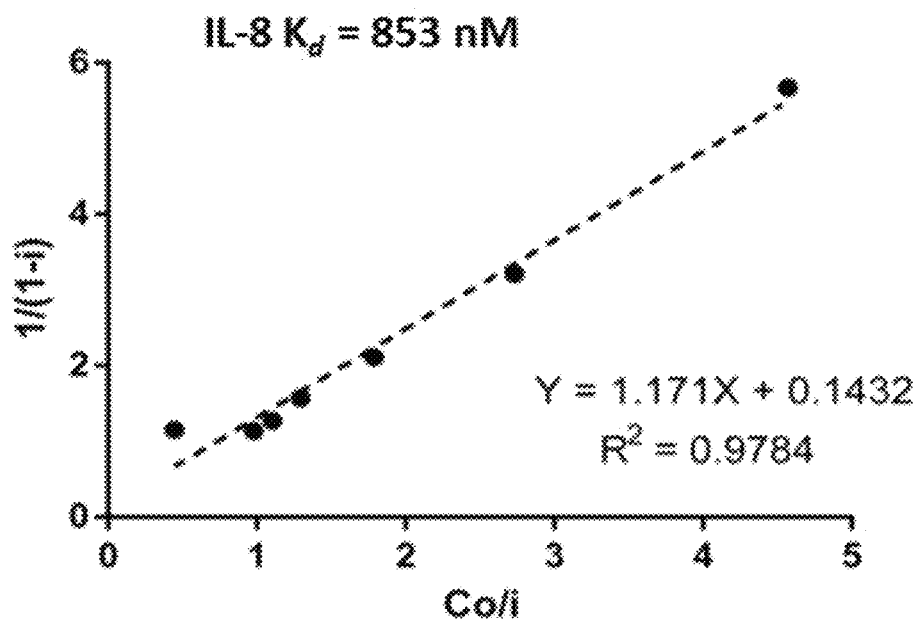

Further, the present invention also demonstrated via indirect ELISA for measuring ONCO P8-CXCR1 and IL-8-CXCR1 complex formation. The ELISA binding assay indicated that ONCO P-8 (FIG. 17A) could bind to CXCR1 tighter 3-4 fold than IL-8 (FIG. 17B). The $K_d$ value of ONCO P8 was 286 nM. The $K_d$ value of IL-8 was 853 nM. The $K_d$ Equation include: (1) $i = A_{450nm}/A^{max}_{450\ nm}$, then $i = \text{Ligand}/\text{Ligand}^{max}$; (2) $1/(1-i) = (\text{Lig}_{tot}/i)/K_d - b$, $b = fqS_{rec}/K_d$.

In summary, the pharmaceutical composition attenuate expression of IL-8, CXCR1, CXCR2 in tumor microenvironment via synergistic effect, inhibits tumor growth via downregulating IL-8, blocks cancer cell migration and invasion via downregulating IL-8, and treats metastases or reduces metastatic spread. Further, the above-mentioned drug-resistant cell over-expresses IL-8.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes, and substitutions are intended in the foregoing disclosures. It will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. A method of treating a gemcitabine-resistant pancreatic cancer, comprising:
administering a chemokine receptor antagonistic modified peptide combined with gemcitabine in a therapeutically effective amount to the gemcitabine-resistant pancreatic cancer subject in need thereof,
wherein the chemokine receptor antagonistic modified peptide is ONCO P-8 set forth in SEQ ID NO: 1.

2. The method according to claim 1, wherein the therapeutically effective amount of the ONCO P-8 set forth in SEQ ID NO:1 is from about 0.01 mg/kg to about 500 mg/kg body weight per dose, and wherein the ONCO P-8 set forth in SEQ ID NO:1 is administered by inhalation of a liquid solution or suspension, or by inhalation of a dry powder formulation of the ONCO P-8 set forth in SEQ ID NO:1.

3. The method according to claim 1, wherein the gemcitabine-resistant cancer subject is selected from mammals, and wherein the mammals are selected from cat, dog, rabbit, cattle, horse, sheep, goat, monkey, mouse, rat, gerbil, guinea pig, pig and human.

* * * * *

SEQUENCE LISTING

```
<160> NUMBER OF SEQ ID NOS: 21

<210> SEQ ID NO 1
<211> LENGTH: 72
<212> TYPE: PRT
<213> ORGANISM: Artificial Sequence
<220> FEATURE:
<223> OTHER INFORMATION: ONCO P-8

<400> SEQUENCE: 1

Gly Ser Lys Glu Leu Arg Cys Gln Cys Ile Arg Ser Tyr Ser Lys Pro
1               5                   10                  15

Phe His Pro Lys Phe Ile Lys Glu Leu Arg Val Ile Pro Ala Ser Gln
            20                  25                  30

Phe Cys Ala Asn Thr Glu Ile Ile Val Lys Leu Ser Asp Gly Arg Glu
        35                  40                  45

Leu Cys Leu Asp Pro Lys Glu Asn Trp Val Gln Arg Val Val Glu Lys
    50                  55                  60

Phe Leu Lys Arg Ala Glu Asn Ser
65                  70

<210> SEQ ID NO 2
<211> LENGTH: 21
<212> TYPE: DNA
<213> ORGANISM: Artificial Sequence
<220> FEATURE:
<223> OTHER INFORMATION: CXCL8 forward primer

<400> SEQUENCE: 2
gagcactcca taaggcacaa a                                            21

<210> SEQ ID NO 3
<211> LENGTH: 18
<212> TYPE: DNA
<213> ORGANISM: Artificial Sequence
<220> FEATURE:
<223> OTHER INFORMATION: CXCL8 reverse primer
```

```
<400> SEQUENCE: 3
atggttcctt ccggtggt                                              18

<210> SEQ ID NO 4
<211> LENGTH: 20
<212> TYPE: DNA
<213> ORGANISM: Artificial Sequence
<220> FEATURE:
<223> OTHER INFORMATION: CXCL1 forward primer

<400> SEQUENCE: 4
gaccaacatc gcagacacat                                            20

<210> SEQ ID NO 5
<211> LENGTH: 20
<212> TYPE: DNA
<213> ORGANISM: Artificial Sequence
<220> FEATURE:
<223> OTHER INFORMATION: CXCL1 reverse primer

<400> SEQUENCE: 5
tgcttgtctc gttccacttg                                            20

<210> SEQ ID NO 6
<211> LENGTH: 25
<212> TYPE: DNA
<213> ORGANISM: Artificial Sequence
<220> FEATURE:
<223> OTHER INFORMATION: CXCL2 forward primer

<400> SEQUENCE: 6
ggctaagcaa aatgtgatat gtacc                                      25

<210> SEQ ID NO 7
<211> LENGTH: 20
<212> TYPE: DNA
<213> ORGANISM: Artificial Sequence
<220> FEATURE:
<223> OTHER INFORMATION: CXCL2 reverse primer

<400> SEQUENCE: 7
caaggttcgt ccgtgttgta                                            20

<210> SEQ ID NO 8
<211> LENGTH: 23
<212> TYPE: DNA
<213> ORGANISM: Artificial Sequence
<220> FEATURE:
<223> OTHER INFORMATION: ALDH1A1 forward primer

<400> SEQUENCE: 8
cactgtgact gttttgacct ctg                                        23

<210> SEQ ID NO 9
<211> LENGTH: 22
<212> TYPE: DNA
<213> ORGANISM: Artificial Sequence
<220> FEATURE:
<223> OTHER INFORMATION: ALDH1A1 reverse primer

<400> SEQUENCE: 9
tttggtggat tcaagatgtc tg                                         22

<210> SEQ ID NO 10
```

```
<211> LENGTH: 20
<212> TYPE: DNA
<213> ORGANISM: Artificial Sequence
<220> FEATURE:
<223> OTHER INFORMATION: BMI-1 forward primer

<400> SEQUENCE: 10
acaaactatg gcccaatgct                                                     20

<210> SEQ ID NO 11
<211> LENGTH: 21
<212> TYPE: DNA
<213> ORGANISM: Artificial Sequence
<220> FEATURE:
<223> OTHER INFORMATION: BMI-1 reverse primer

<400> SEQUENCE: 11
aaccattgtt tggatttgga a                                                   21

<210> SEQ ID NO 12
<211> LENGTH: 19
<212> TYPE: DNA
<213> ORGANISM: Artificial Sequence
<220> FEATURE:
<223> OTHER INFORMATION: KLF4 forward primer

<400> SEQUENCE: 12
cgatcgtctt ccctctttt                                                      19

<210> SEQ ID NO 13
<211> LENGTH: 18
<212> TYPE: DNA
<213> ORGANISM: Artificial Sequence
<220> FEATURE:
<223> OTHER INFORMATION: KLF4 reverse primer

<400> SEQUENCE: 13
gccgctccat taccaaga                                                       18

<210> SEQ ID NO 14
<211> LENGTH: 19
<212> TYPE: DNA
<213> ORGANISM: Artificial Sequence
<220> FEATURE:
<223> OTHER INFORMATION: NESTIN forward primer

<400> SEQUENCE: 14
gtgccgtcac ctccattag                                                      19

<210> SEQ ID NO 15
<211> LENGTH: 21
<212> TYPE: DNA
<213> ORGANISM: Artificial Sequence
<220> FEATURE:
<223> OTHER INFORMATION: NESTIN reverse primer

<400> SEQUENCE: 15
cagtagtgca ccatctcact g                                                   21

<210> SEQ ID NO 16
<211> LENGTH: 20
<212> TYPE: DNA
<213> ORGANISM: Artificial Sequence
<220> FEATURE:
<223> OTHER INFORMATION: NANOG forward primer

<400> SEQUENCE: 16
```

```
ggtacgtgct gaggccttct                                                  20

<210> SEQ ID NO 17
<211> LENGTH: 20
<212> TYPE: DNA
<213> ORGANISM: Artificial Sequence
<220> FEATURE:
<223> OTHER INFORMATION: NANOG reverse primer

<400> SEQUENCE: 17
acaggtgaag acctggttcc                                                  20

<210> SEQ ID NO 18
<211> LENGTH: 21
<212> TYPE: DNA
<213> ORGANISM: Artificial Sequence
<220> FEATURE:
<223> OTHER INFORMATION: OCT4 forward primer

<400> SEQUENCE: 18
gaggggttga gtagtccctt c                                                21

<210> SEQ ID NO 19
<211> LENGTH: 19
<212> TYPE: DNA
<213> ORGANISM: Artificial Sequence
<220> FEATURE:
<223> OTHER INFORMATION: OCT4 reverse primer

<400> SEQUENCE: 19
gaaatccgaa gccaggtgt                                                   19

<210> SEQ ID NO 20
<211> LENGTH: 18
<212> TYPE: DNA
<213> ORGANISM: Artificial Sequence
<220> FEATURE:
<223> OTHER INFORMATION: SOX2 forward primer

<400> SEQUENCE: 20
gcagtacaac tccatgac                                                    18

<210> SEQ ID NO 21
<211> LENGTH: 20
<212> TYPE: DNA
<213> ORGANISM: Artificial Sequence
<220> FEATURE:
<223> OTHER INFORMATION: SOX2 reverse primer

<400> SEQUENCE: 21
tgcttgtctc gttccacttg                                                  20
```